(12) United States Patent
Kima

(10) Patent No.: US 6,634,986 B2
(45) Date of Patent: Oct. 21, 2003

(54) POWER TRANSMISSION DEVICE

(75) Inventor: Yasuo Kima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 09/985,016

(22) Filed: Nov. 1, 2001

(65) Prior Publication Data

US 2002/0065168 A1 May 30, 2002

(30) Foreign Application Priority Data

Nov. 24, 2000 (JP) ......................... 2000-358320

(51) Int. Cl.[7] .............................................. B60K 41/04
(52) U.S. Cl. .............................. 477/107; 477/3; 475/5; 74/339
(58) Field of Search .................... 477/3, 107; 475/5, 475/209; 74/339

(56) References Cited

U.S. PATENT DOCUMENTS 5,771,478 A * 6/1998 Tsukamoto et al. ........... 701/68
5,833,570 A * 11/1998 Tabata et al. .................. 477/3
6,278,915 B1 * 8/2001 Deguchi et al. ............. 701/22

FOREIGN PATENT DOCUMENTS

JP          09-158998          6/1997

\* cited by examiner

*Primary Examiner*—Charles A Marmor
*Assistant Examiner*—Dennis Abdelnour
(74) *Attorney, Agent, or Firm*—Arent Fox Kintner Plotkin & Kahn, PLLC

(57) ABSTRACT

The invention reduces the shift shock of a device equipped with a plurality of prime movers, and provides a power transmission device of a device having a first prime mover (engine) 1 and a second prime mover (motor) 2 as drive sources, which is arranged so that in the process of shifting from the first speed stage to the second speed stage, the increase or decrease in the rotation speed of the first prime mover (engine) 1 is the reverse of the increase or decrease in the rotation speed of the second prime mover (motor) 2. Also, in the process of shifting from a first speed stage to a second speed stage, control is performed so that a torque, which cancels out the inertia torque of one prime mover (engine) 1, is output by the other prime mover (motor) 2.

8 Claims, 26 Drawing Sheets

SECOND SPEED

FIG.20 FOURTH SPEED

REVERSE

POWER TRANSMISSION DEVICE

FIELD OF THE INVENTION

This invention concerns a power transmission device equipped with a plurality of prime movers, such as a gasoline engine, motor, etc., and, in particular, concerns a power transmission device with which the shift shock is reduced or eliminated by control of the speed stages and the prime movers.

BACKGROUND OF THE INVENTION

Inventions disclosed in Japanese laid-open patent publication No. Hei 9-158998, etc. are known as prior arts of a power transmission device equipped with an engine and a motor. The invention discloses a vehicle driving device, which is equipped with an engine, a motor generator, a transmission, and a planetary gear that is connected to the engine via a starting clutch and is connected to the motor generator and transmission, and a control device for this vehicle driving device. This vehicle driving device is characterized in that the planetary gear is used as a synthesizing and distributing mechanism for the driving forces of the engine and the motor and in that the motor generator is driven prior to the engagement of the starting clutch in order to lessen the generation of inertia torque due to the lagging of the startup of the rotation of the motor generator.

However, the invention disclosed in Japanese laid-open patent publication No. Hei 9-158998 only prevents the lagging of the increase in rotation of the motor generator at the time of startup and could not lessen the shift shock that occurs in the process of shifting between various speed stages, such as from low gear to second speed, second speed to third speed, etc.

An object of this invention is thus to reduce or eliminate the shift shock in the take-off process and in the process of shifting between various speed stages in a power transmission device of a device having a plurality of prime movers, such as a gasoline engine, motor, etc.

SUMMARY OF THE INVENTION

In order to achieve the above object, this invention provides a power transmission device that is arranged so that in the shifting process, the inertia torques and output torques of a first prime mover and a second prime mover cancel each other out, thereby reducing the shift shock.

That is, the first aspect of this invention provides in a power transmission device of a device having a first prime mover and a second prime mover as drive sources, a power transmission device characterized in being arranged so that the respective inertia forces of the first prime mover and the second prime mover cancel each other out in the process of shifting from a first speed stage to a second speed stage.

By the above arrangement, the inertia force of the first prime mover and the inertia force of the second prime mover cancel out to enable reduction of the shift shock.

The second aspect of this invention provides an arrangement characterized in that in the process of shifting from the first speed stage to the second speed stage, the increase or decrease in the rotation speed of the first prime mover is the reverse of the increase or decrease in the rotation speed of the second prime mover.

With a vehicle equipped with just a single prime mover, since the rotation speed of the prime mover changes in the process of shifting, the shift shock is reduced by connecting the output shaft and the prime mover after completion of the change or by connecting gradually in the connection process. With the invention of the second aspect, the shift shock can be reduced or eliminated in a device having at least two prime movers by connecting a gear, etc., in a manner such that when the rotation speed of one of the prime movers drops during the shifting process, the rotation speed of the other prime mover increases, thereby enabling the excess inertia energy of one prime mover to be absorbed by the kinetic energy of the other prime mover.

The third aspect of this invention provides a power transmission device as set forth in the second aspect, wherein the shifting from the first speed stage to the second speed stage of the first prime mover and the shifting from the first speed stage to the second speed stage of the second prime mover are carried out substantially simultaneously.

With the invention of the second aspect, when a deviation in timing occurs between the shifting of one of the prime movers and the shifting of the other prime mover, the inertia energies of both prime movers will not be canceled out when only one or the other prime mover is undergoing the shifting process. It is thus preferable for the rotation speed to change as simultaneously as possible. Thus with a power transmission device, with which control is performed as set forth in the third aspect, the shift shock can be reduced or eliminated more effectively.

The fourth aspect of this invention provides a power transmission device as set forth in the second aspect, wherein at least one of either the first prime mover or second prime mover is a motor and, in the process of shifting from the first speed stage to the second speed stage, the output torque of the motor is controlled so that the inertia torque of the driving parts at the first prime mover side and inertia torque of the driving parts at the second prime mover side cancel each other out before and after the shift.

The fifth aspect of this invention provides a power transmission device as set forth in the fourth aspect, wherein
the shifting from the first speed stage to the second speed stage of the first prime mover and the shifting from the first speed stage to the second speed stage of the second prime mover are carried out substantially simultaneously.

In comparison to a gasoline engine and other types of prime movers, a motor is good in output torque response and is more easy to control. Thus by using a motor as one of the prime movers and controlling the output torque of the motor so that the inertia torque during the shifting of one of the prime movers is canceled out by the motor, which is the other prime mover, the shift shock can be eliminated substantially completely. There are cases where the output torque of a motor must be generated and cases where the output torque must be made to act as a load for use in regenerative power generation, etc.

With a power transmission device, with which control is performed as set forth in the fifth aspect, the shift shock can be reduced or eliminated more effectively.

The sixth aspect of this invention provides a power transmission device as set forth in the first aspect, wherein
in the process of shifting from the first speed stage to the second speed stage, control is performed so that a torque that cancels out the inertia torque of one of the prime movers is output by the other prime mover.

By this arrangement, since the inertia torque during the shifting of one of the prime movers will be canceled out by the output of the other prime mover as in the case of the invention of the fourth aspect, the shift shock can be eliminated substantially completely.

The seventh aspect of this invention provides a power transmission device as set forth in the first aspect, wherein the power transmission device has a planetary gear set, a prime mover, which is connected to the respective rotating elements of the planetary gear set, a motor, and an output shaft, and in the process of shifting from the first speed stage to the second speed stage, the increase or decrease in the rotation speed of the prime mover is in a reverse relationship with respect to the increase or decrease in the rotation speed of the motor and the output of the motor is controlled so that the inertia torques of the prime mover and the motor cancel each other out.

By this arrangement, since the inertia torque during the shifting of one of the prime movers will be canceled out by the output of the other prime mover as in the case of the invention of the fourth aspect, the shift shock can be eliminated substantially completely. Also, the timing of the shifting of the prime mover and the shifting of the motor can be adjusted mechanically.

The eighth aspect of this invention provides a power transmission device as set forth in the first aspect, wherein the power transmission device is equipped with a planetary gear set, a first transmission part, a prime mover, which is connected to the planetary gear set via the first transmission part, a motor and a second transmission part, which are connected to the planetary gear set, and an output shaft, which is connected to the first transmission part and second transmission part, the second transmission part is connected to one rotating element, among the planetary gear's three rotating elements of sun gear, ring gear, and carrier, which is selected so that when the one rotating element is fixed, the other two rotating elements rotate in mutually opposite directions, and each of the prime mover and motor is connected to one of the two rotating elements.

With such a power transmission device, by means of the first transmission part, the rotation speed of the output shaft is transmitted to the prime mover to change the rotation speed of the prime mover and this change of rotation speed of the prime mover changes, via the planetary gear set, the rotation speed of the motor. Also, since the prime mover and the motor are made to rotate in mutually opposite directions when the second transmission part is fixed, the increase or decrease in the rotation speed of the prime mover and the increase or decrease in the rotation speed of the motor will be in a mutually reversed relationship when the second transmission part, which is connected to the output shaft, is rotating at constant rotation speed. Since the inertia torque of the prime mover and the inertia torque of the motor are thus made to cancel each other out by the above-described relationship in the process wherein the rotation of the output shaft increases or decreases the rotation speed of the prime mover via the first transmission part and the change of rotation speed of the prime mover increases or decreases the rotation speed of the motor, the shift shock is reduced.

The ninth aspect of this invention provides a power transmission device as set forth in the first aspect, wherein the power transmission device is equipped with a planetary gear set, a first transmission part, a prime mover, which is connected to the planetary gear set via the first transmission part, a motor and a second transmission part, which are connected to the planetary gear set, and an output shaft, which is connected to the first transmission part and second transmission part, the second transmission part is connected to one rotating element, among the planetary gear's three rotating elements of sun gear, ring gear, and carrier, which is selected so that when the one rotating element is fixed, the other two rotating elements will rotate in mutually opposite directions, each of the prime mover and the motor is connected to one of the two rotating elements, and in the process of shifting from the first speed stage to the second speed stage, the first transmission part and the second transmission part are controlled so as to be actuated substantially simultaneously and the output of the motor is controlled so that the inertia torques of the prime mover and the motor cancel each other out.

With such a power transmission device, by means of the first transmission part, the rotation speed of the output shaft is transmitted to the prime mover to change the rotation speed of the prime mover and this change of rotation speed of the prime mover changes, via the planetary gear set, the rotation speed of the motor. Also, since the prime mover and the motor are made to rotate in mutually opposite directions when the second transmission part is fixed, the increase or decrease in the rotation speed of the prime mover and the increase or decrease in the rotation speed of the motor will be in a mutually reversed relationship when the second transmission part, which is connected to the output shaft, is rotating at constant rotation speed. Since the inertia torque of the prime mover and the inertia torque of the motor are thus made to cancel each other out by the above-described relationship in the process wherein the rotation of the output shaft increases or decreases the rotation speed of the prime mover via the first transmission part and the change of rotation speed of the prime mover increases or decreases the rotation speed of the motor, the shift shock is reduced. Furthermore, since the first transmission part and the second transmission part are actuated substantially simultaneously, the generation and canceling out of the inertia torques occur substantially simultaneously, and since the output of the motor is controlled so that the part of the inertia torque that could not be canceled out completely will be canceled out, the shift shock can be practically eliminated.

In the claims and the specification, "prime mover" shall include motors. Also, "connection" shall refer to connection by gears, etc., connection by a shaft, and other conditions enabling the transmission of power.

The shift "from a first speed stage to a second speed stage" is not limited to a shift from the low gear to the second speed gear but refers to a shift from a certain gear to another gear and thus includes a shift from the second speed gear to the third speed gear, a shift from the fourth speed gear to the second speed gear, etc.

Also, though "planetary gear set" shall refer to a gear set having a sun gear, ring gear, and carrier, the gear set may be comprised of just a single planetary gear (pinion gear) or may have a plurality of planetary gears, in other words, two or more planetary gears. In the case of a planetary gear set comprised of one planetary gear, the carrier corresponds to being the rotating element that is connected to the second transmission part in the invention of the eighth aspect or the ninth aspect and the prime mover or the motor may be connected to either the sun gear or the ring gear. Also, in the case of a planetary gear set comprised of two planetary gears, the ring gear carrier corresponds to being the rotating element that is connected to the second transmission part in the invention of the eighth aspect or the ninth aspect and the prime mover or the motor may be connected to either the carrier or the sun gear.

As has been described in detail above, this invention provides the following significant effects.

With the inventions of the first and second aspects, since the inertia torque of the first prime mover and the inertia torque of the second prime mover cancel each other out in the process of shifting in a vehicle, shift shock can be reduced.

With the invention of the third aspect, by performing the shifting operations of the first prime mover and the second prime mover simultaneously, shift shock can be reduced more effectively.

With the invention of the fourth aspect, since a motor, which is good in torque controllability, is used as at least one of the prime movers and the inertia torque that could not be canceled out completely is canceled out further by control of the motor torque, shift shock can be practically eliminated.

With the invention of the fifth aspect, by performing the shifting operations of the first prime mover and the second prime mover simultaneously, shift shock can be reduced more effectively.

With the invention of the sixth aspect, since in the process of shifting in a vehicle, control is performed so that a torque, which will cancel out the inertia torque of one of the prime movers, is output by the other prime mover, shift shock can be reduced.

With the inventions of the seventh to ninth aspects, since the rotation speeds of a prime mover and a motor can be varied while keeping the rotation speed of the output shaft fixed by means of a power transmission device, with which the prime mover, motor, and output shaft are connected via planetary gear set, a power transmission device of this invention can be arranged readily, and furthermore, with the inventions of the seventh and ninth aspects, since control is performed so that the inertia torque in the shifting process will be canceled out by means of a motor that is good in controllability, shift shock can be practically eliminated.

DESCRIPTION OF THE PREFERRED EMBODIMENT

Embodiments of this invention shall now be described with reference to the drawings where appropriate.

Figure 1:
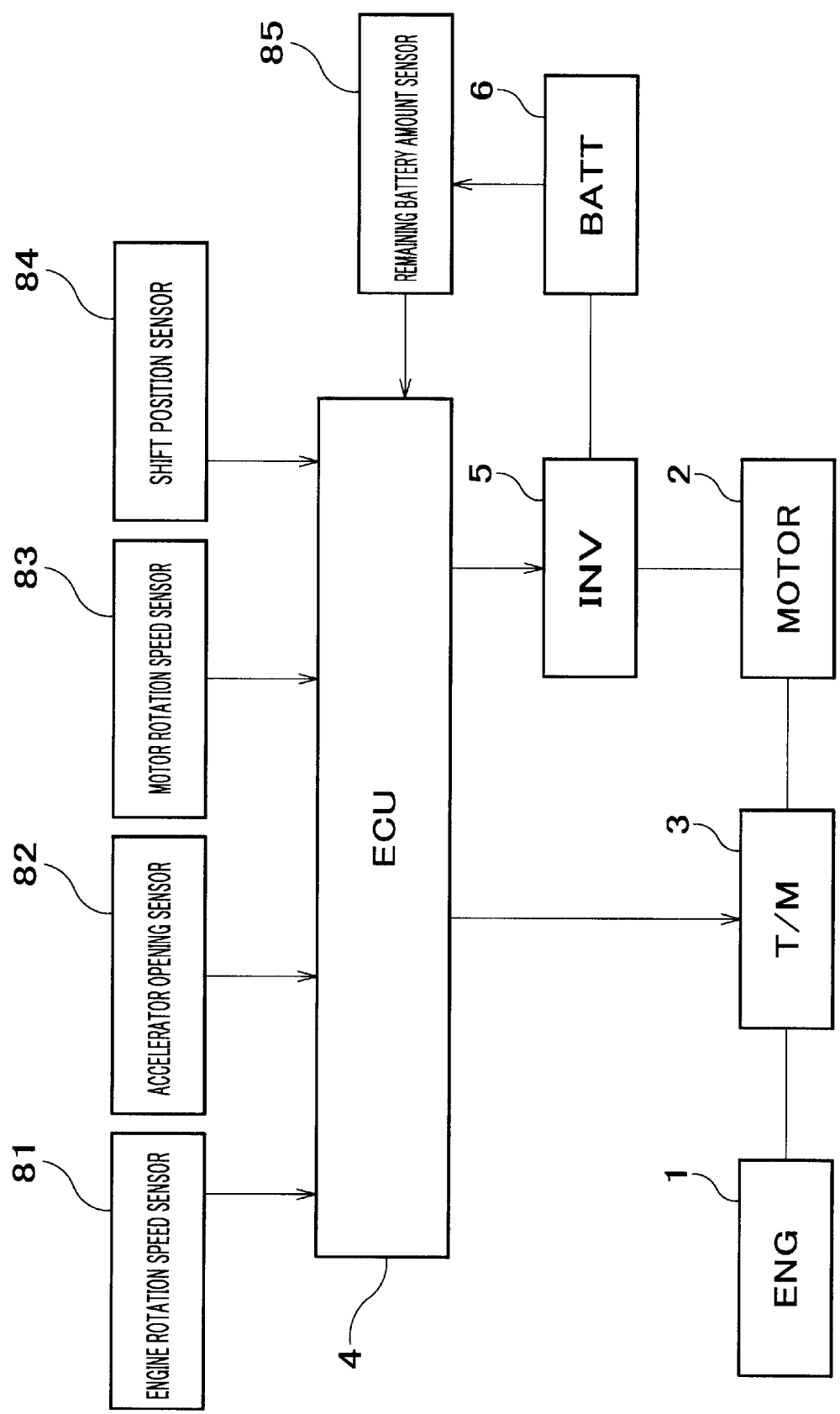
FIG. 1 is a block diagram, which shows the system arrangement of a power transmission device by this invention.

FIG. 1 is a block diagram, which shows the system arrangement of a power transmission device by this invention. In the following description, the abbreviation indicated within parenthesis shall be used where appropriate.

This power transmission device comprises an engine (ENG) 1, which is the first prime mover, a motor 2, which is the second prime mover that aids the driving of the drive shaft by means of electrical energy and has the regenerative function of converting the kinetic energy of the drive shaft to electrical energy, a transmission (T/M) 3, and a motor transmission electronic control unit (ECU) 4, which controls motor 2 and transmission 3. As information detection means for control, ECU 4 is equipped with an engine rotation speed sensor 81, accelerator opening sensor 82, motor rotation speed sensor 83, shift position sensor 84, remaining battery (BATT) amount sensor 85, etc. Motor 2 uses a battery (BATT) 6 as the power source and is controlled based on signals from ECU 4 via an inverter (INV) 5. Also, transmission 3 is controlled by ECU 4 via an unillustrated hydraulic control means. The control by ECU 4 is carried out by the execution of a program stored in ECU 4.

As two examples of such a power transmission device of this invention having the above-described system arrangement, an automatic manual transmission type power transmission device, which is based on a mechanical manual transmission, and a 4-speed automatic transmission type power transmission device, which is based on an automatic transmission, shall be described below.

[AMT Power Transmission Device]

Figure 2:
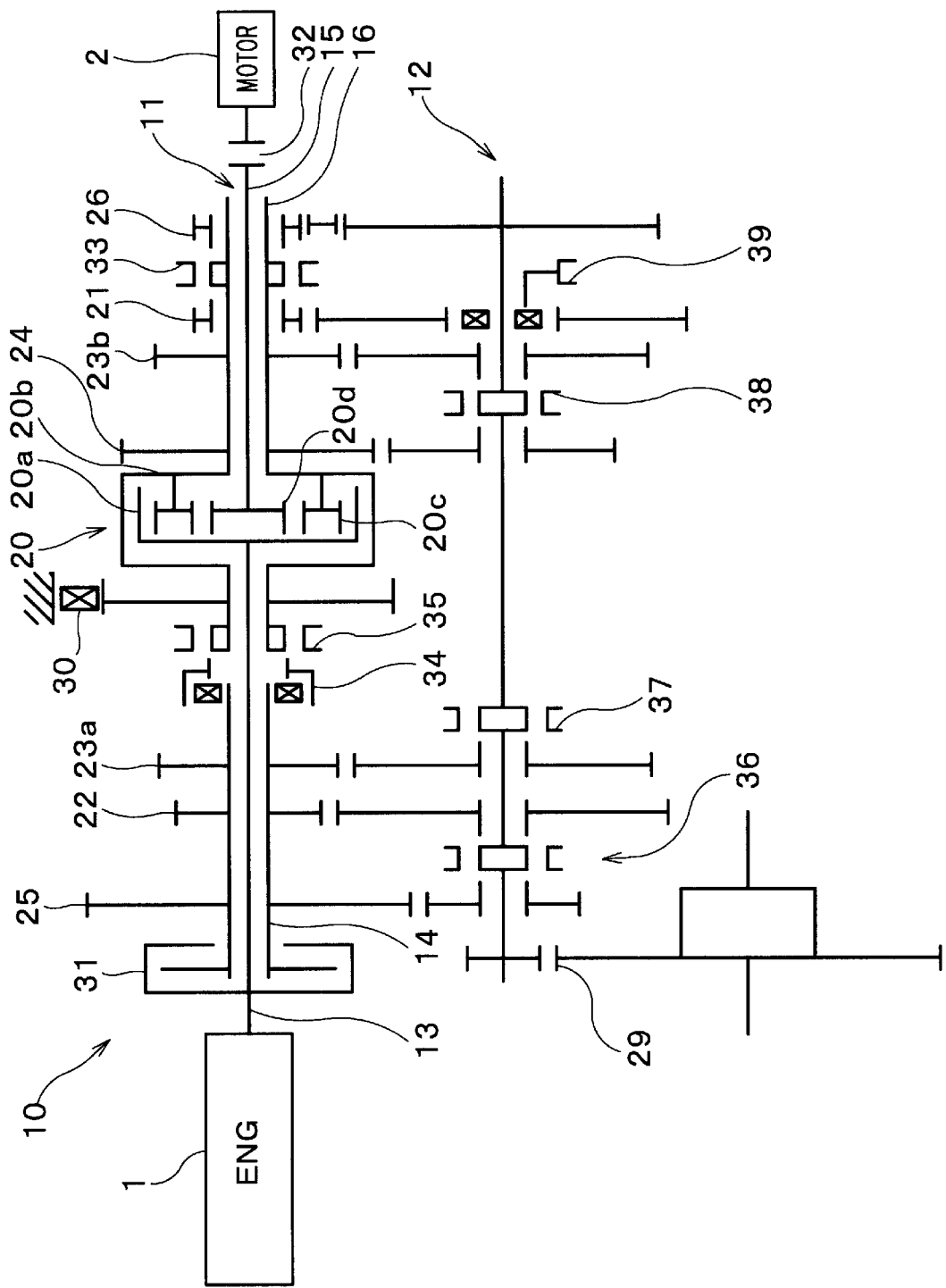
FIG. 2 is a diagram, which shows the gear arrangement of an AMT power transmission device.

FIG. 2 is a diagram, which shows the gear arrangement of an automatic manual transmission type (AMT) power transmission device of the first embodiment of the invention.

In terms of basic arrangement, the AMT power transmission device 10 of the first embodiment is comprised of a main shaft 11, at the respective ends of which are disposed engine 1 and motor 2, and a counter shaft 12, which receives the power from main shaft 11 via various gears and transmits the power to the driving wheel via final gear 29.

Main shaft 11 is furthermore comprised of an ENG output shaft 13, which is the output shaft of the engine, a main primary shaft (MPS) 14, a motor output shaft 15, which transmits the power of the motor via motor clutch 32, and a main secondary shaft (MSS) 16.

ENG output shaft 13 has its shaft end connected to ring gear 20*a* of a planetary gear set 20 and is arranged to transmit power to MPS 14 via a main clutch 31 that is positioned at the engine side.

MPS 14 receives the power from engine output shaft 13 and is arranged to transmit power to counter shaft 12 via fifth-speed gear 25, second-speed gear 22, or primary third-speed gear 23*a*. The end of MPS 14 at the side opposite the engine side is connected to carrier 20*b* of planetary gear set 20 via 134 one-way clutch (134 O/W) 34 and 134 synchromesh 35. With 134 O/W 34, the input from the engine 1 side can be transmitted in the forward direction.

Motor output shaft 15 receives the power of motor 2 via motor clutch 32 and the shaft end at the engine 1 side is connected to sun gear 20*d* of planetary gear set 20.

MSS 16 has one end connected to carrier 20*b* and transmission of power with counter shaft 12 is enabled via low gear 21, secondary third-speed gear 23*b*, fourth-speed gear 24, or reverse gear 26. Among the above, low gear 21 and reverse gear 26 are arranged so that one of either will be connected by the shifting of the low/reverse dog clutch (Low RVS DOG) 33.

Carrier 20*b* is connected to a starter one-way clutch 30 and is enabled to move only in the direction of forward motion.

Counter shaft 12 is made connectable to main shaft 11 via low gear 21, second-speed gear 22, primary third-speed gear 23*a*, secondary third-speed gear 23*b*, fourth-speed gear 24, fifth-speed gear 25, or reverse gear 26 and is enabled to transmit power to the axle shaft via final gear 29. Counter shaft 12 is also connected to the engine via second-speed gear 22, primary third-speed gear 23*a*, or fifth-speed gear 25 and corresponds to being the output shaft as set forth in the claims. Second-speed gear 22, primary third-speed gear 23*a*, and fifth-speed gear 25 correspond to being the first transmission part as set forth in the claims.

Low gear 21 is connected to counter shaft 12 via a two-way clutch (2 WAY) 39.

Second-speed gear 22 and fifth-speed gear 25 are arranged so that one of either will be connected to counter shaft 12 by the shifting of a 25 synchromesh 36.

Primary third-speed gear 23*a* is made connectable to counter shaft 12 via 3 synchromesh 37.

Secondary third-speed gear 23*b* and fourth-speed gear 24 are arranged so that one of either will be connected to counter shaft 12 by the shifting of a 34 dog clutch (34 DOG) 38.

Reverse gear 26 is connected to counter shaft 12 by Low RVS DOG 33.

Planetary gear set 20 is comprised of ring gear 20*a*, planetary gear 20*c*, sun gear 20*d*, and carrier 20*b*, which transmits the revolution of planetary gear 20*c* to MSS 16. At a location where a dog clutch is used, a synchromesh may be used instead as appropriate, and at a location where a synchromesh is used, a dog clutch may be used instead as appropriate as long as synchronization of rotation can be achieved successfully.

The operation of AMT power transmission device 10 with the above-described arrangement shall now be described.

<Startup>

Figure 3:
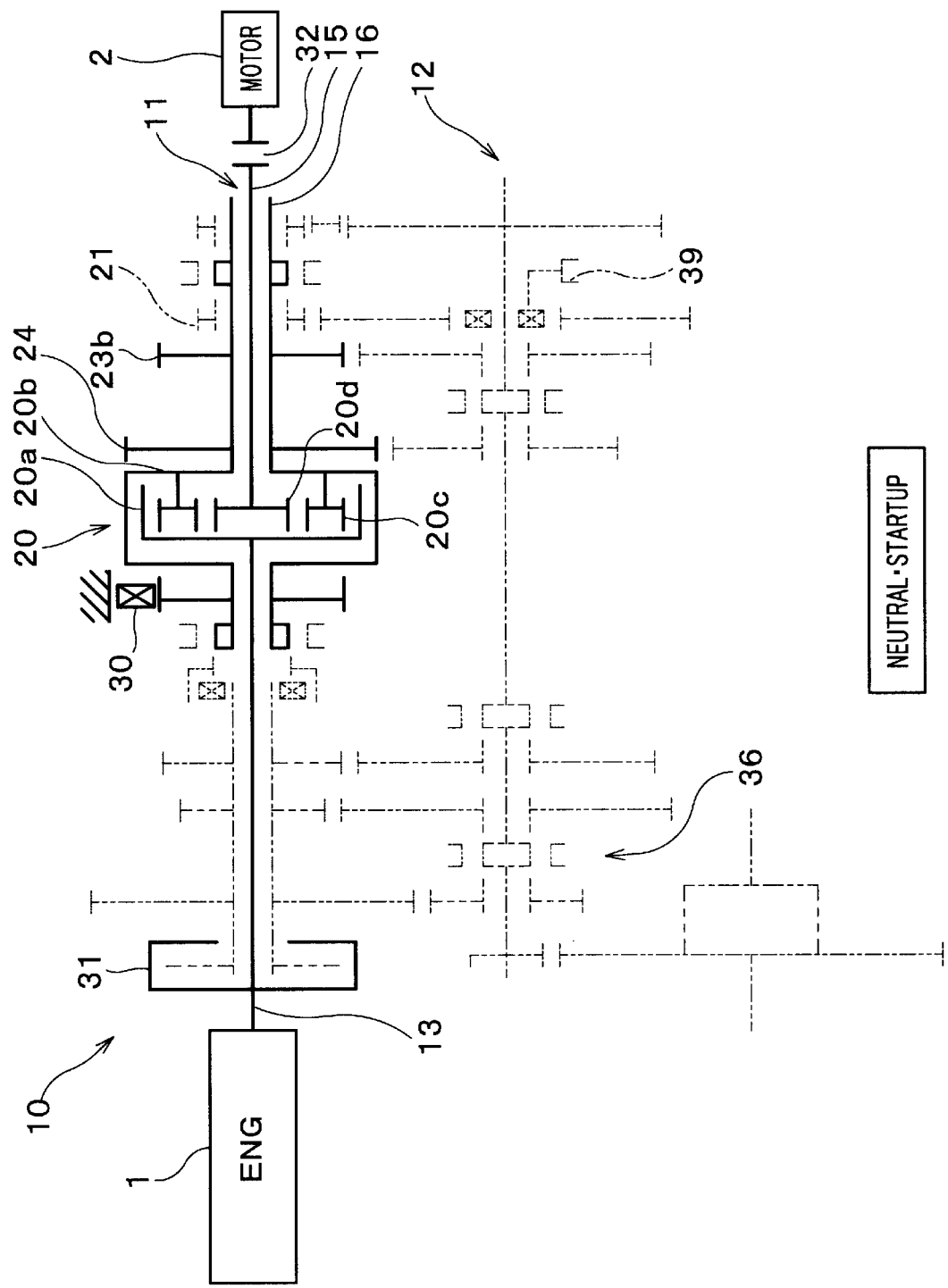
FIG. 3 is a diagram, which shows the gear engagement when the AMT power transmission device is in the neutral condition.

FIG. 3 shows the condition where all of the dog clutches and synchromeshes of the AMT power transmission device are set to OFF, in other words, the neutral condition. In this neutral condition, even if engine 1 is stopped, an unillustrated AC compressor can be driven by the forward rotation of the motor and via fourth-speed gear 24. In the description that follows, it shall be deemed that motor clutch 32 is always connected (ON).

To start up engine 1, motor 2 is made to rotate in reverse in the neutral condition shown in FIG. 3. Carrier 20*b* does not rotate since it is prevented from rotating in reverse by starter one-way clutch 30, and engine 1 is rotated forward by the forward rotation of ring gear 20*a*. Engine 1 is started when the engine rotation speed Ne rises to the startup rotation speed. Though engine 1 is started in the above manner when the gear is in the neutral condition, engine 1 can likewise be started from the condition where engine 1 is stopped with Low RVS DOG 33 being set to Low, for example, as in the case where a vehicle is stopped to wait for a traffic signal, by setting 2 WAY 39 to the reverse released (RER) condition. Also in the case where a vehicle is on a rising slope with engine 1 being stopped, since starter one-way clutch 30 prevents reverse rotation, the sliding down of the vehicle will be prevented as long as low gear 21 is engaged. Excess creep power will thus not be consumed.

<Takeoff>

Figure 10:
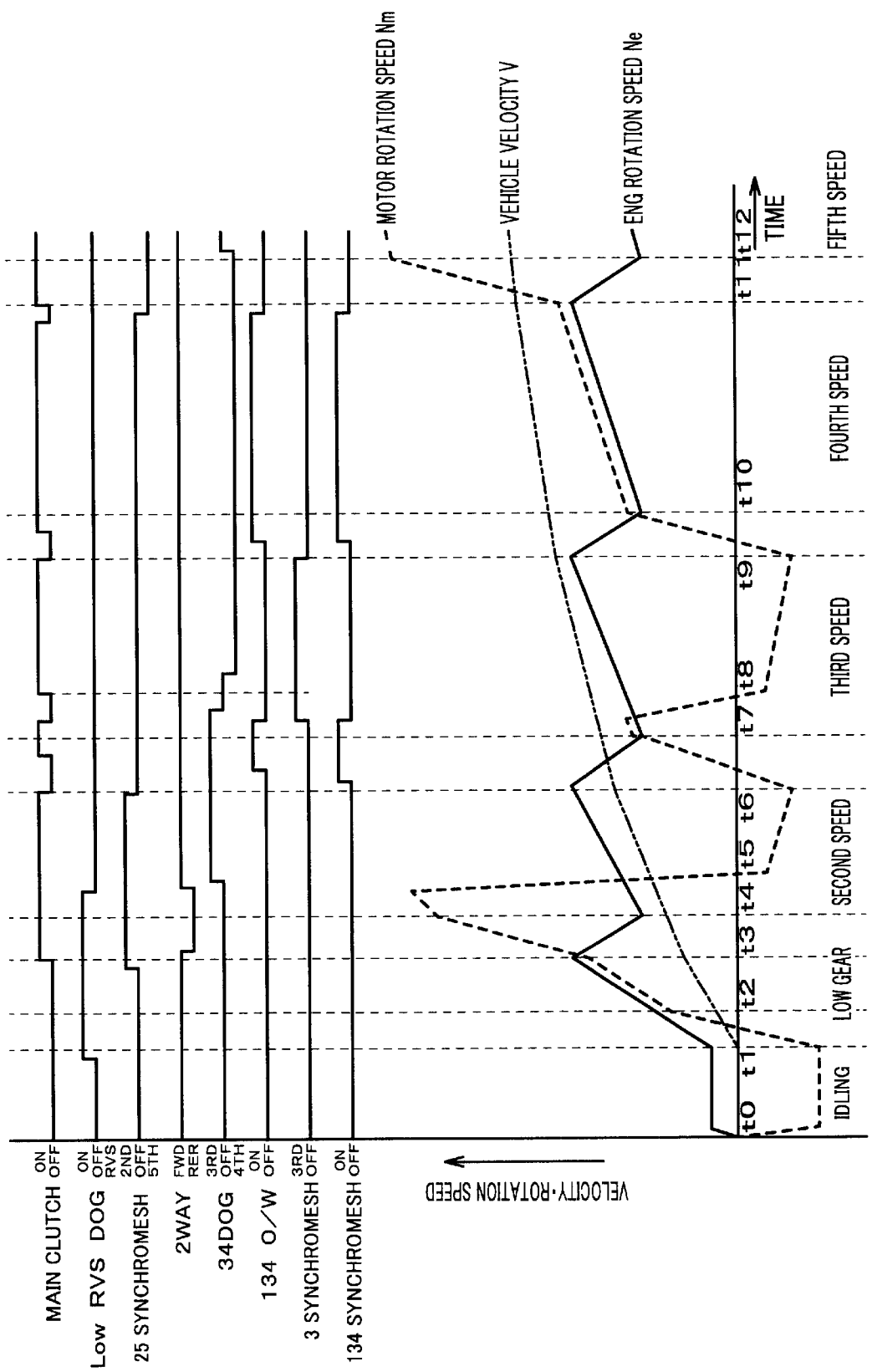
FIG. 10 are graphs, which show the speeds and shift conditions of the various elements when a vehicle equipped with the AMT power transmission device is in the acceleration process.
Figure 11:
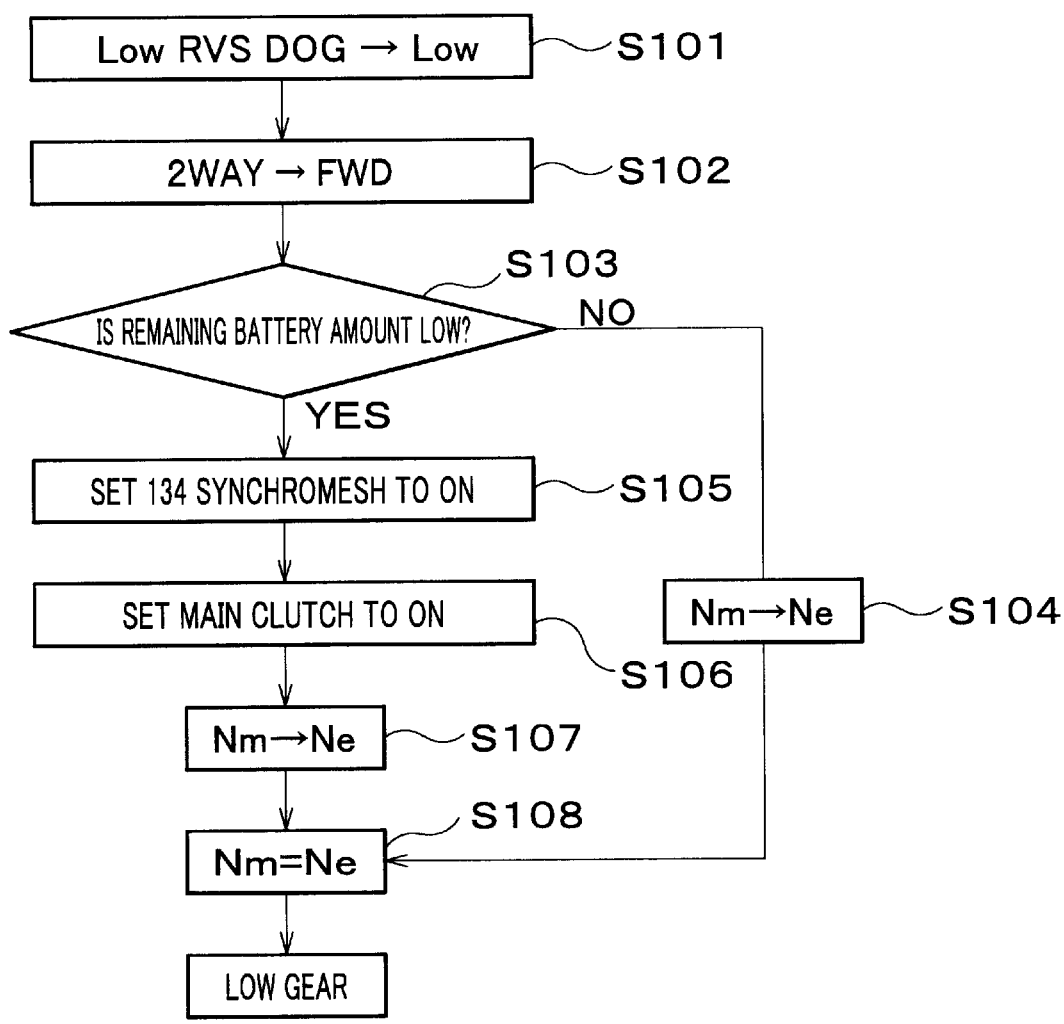
FIG. 11 is a flowchart, which shows the control flow of the AMT power transmission device in the takeoff process.

FIG. 11 shows the control flow of the takeoff process of the AMT power transmission device. FIG. 10 shows graphs, which show the selection of gears and the speeds of the respective elements in the AMT power transmission device as a vehicle is accelerated. The graphs at the lower side of FIG. 10 illustrate the variations of the engine rotation speed Ne (solid line), vehicle velocity V (alternate long and two short dashes line), and motor rotation speed Nm (dotted line) in the acceleration process and the upper side shows the ON/OFF conditions of the respective clutches in correspondence to the graphs at the lower side. The symbols t1, t2, . . . at the time axis indicate conditions of AMT power transmission device 10 and are used in the description that follows.

Figure 4:
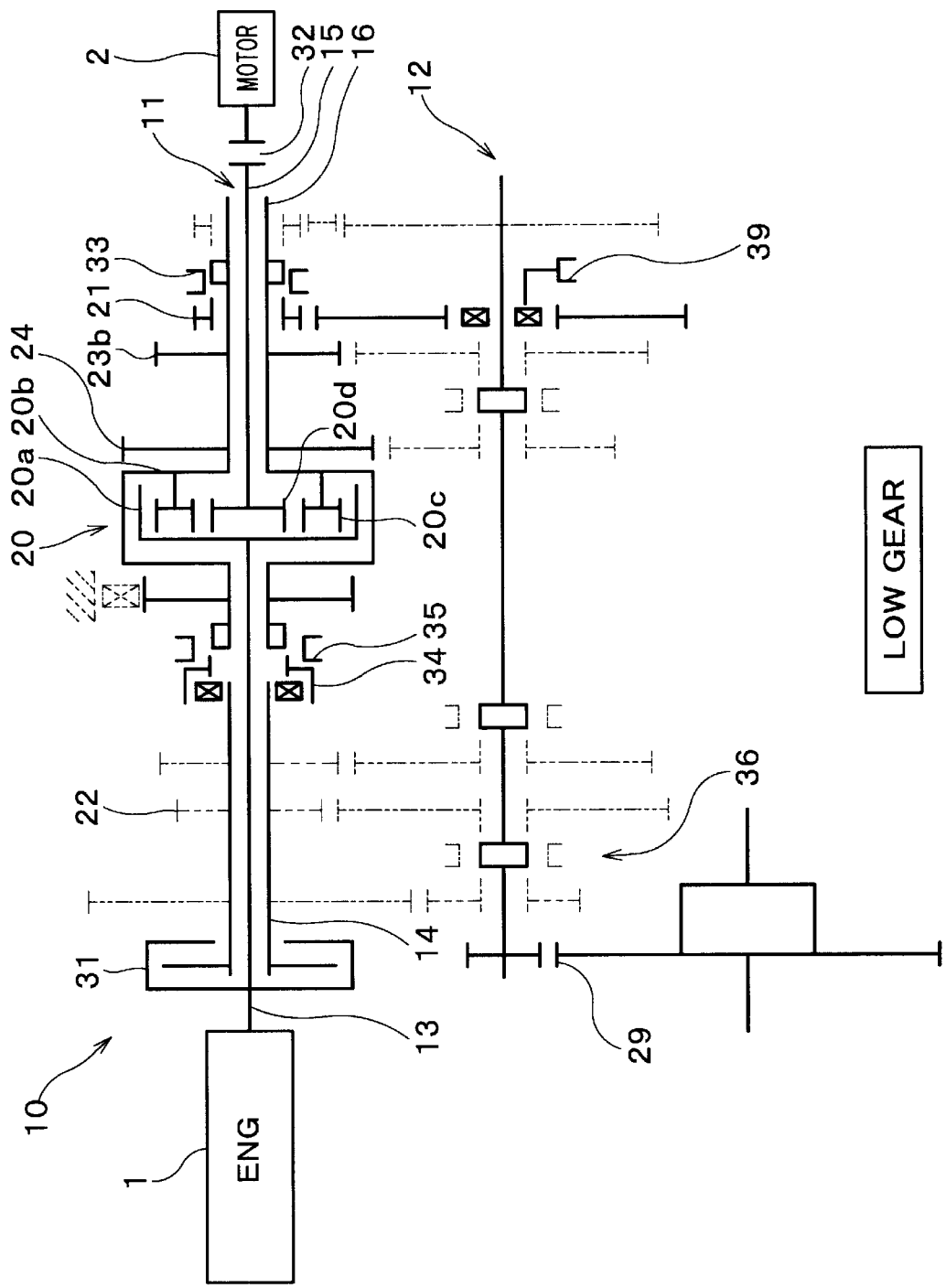
FIG. 4 is a diagram, which shows the gear engagement when the AMT power transmission device is in the low gear condition.

The takeoff control of the vehicle shall now be described with reference to FIGS. 11 and 10. In the process of t0→t1, engine 1 is in the idling condition after being started up and motor 2 is rotated in reverse. To make the vehicle take off, Low RVS DOG 33 is shifted to the low gear 21 side (S101) and 2 WAY 39 is set to the forward side (FWD) (S102). If in this condition the remaining battery amount is sufficient (S103), the motor rotation speed Nm of motor 2, which is rotated in reverse with respect to engine 1, is made to gradually approach and be synchronized with the engine rotation speed Ne (S104, t1→t2). When the engine rotation speed Ne and the motor rotation speed Nm become matched (S108, t2), ring gear 20a, carrier 20b, and sun gear 20d rotate in an integral manner. Meanwhile, if the remaining battery amount is not sufficient, the driving force of engine 1 may be used to synchronize the motor rotation with the engine rotation so as not to place a load on battery 6. That is, by the turning ON of 134 synchromesh 35 (S105) and the turning ON of main clutch 31 (S106), rotations of ring gear 20a and carrier 20b become synchronized and since the rotation speed of sun gear 20d becomes synchronized in accompaniment, the motor rotation speed Nm approaches the engine rotation speed Ne (S107). When the motor rotation speed Nm becomes completely matched with the engine rotation speed Ne (S108), the shift to the low gear is completed. The engagement of the gears at this time is shown in FIG. 4.

Thus with the AMT of this invention, by driving motor 2 and synchronizing the motor rotation with the engine rotation, smooth take off can be achieved with out the use of a take off clutch mechanism and a torque converter mechanism.

Since it can be considered that acceleration using the low gear is normally carried out only for a short time, acceleration is performed with the motor rotation being synchronized with the engine rotation (t2→t3).

<Low→Second Speed>

Figure 12:
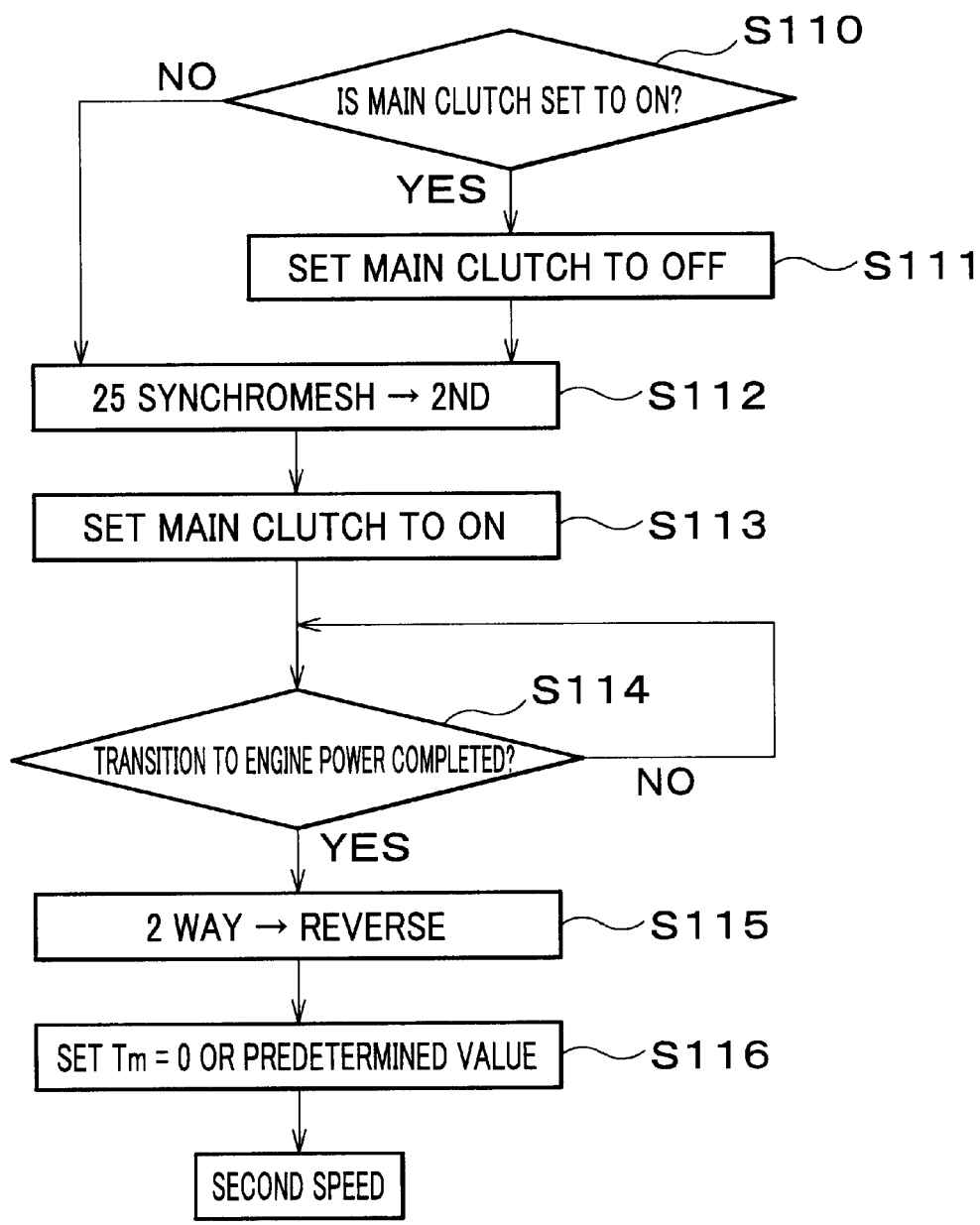
FIG. 12 is a flowchart, which shows the control flow of the AMT power transmission device in the process of shifting from low speed to second speed.

The shifting operation from low to second speed shall now be described with reference to the flowchart of FIG. 12 and FIG. 10.

If main clutch 31 is ON (S110), main clutch 31 is set to OFF (S111) and if main clutch 31 is OFF (S110), main clutch 31 is left as it is. 25 synchromesh 36 is then set to the second-speed side (S112). Thereafter, main clutch 31 is set to ON (S113). In the above process, main clutch 31 is set to OFF once to facilitate the shifting of 25 synchromesh 36.

After setting main clutch to ON (S113), the power of the engine is transferred completely to second-speed gear 22 (S114), and at the same time, 2 WAY 39 is set to the reverse side (S115). Though the gear engagement for the second speed is completed in this condition, since the rotation speeds of engine 1 and motor 2 are not matched with the vehicle velocity, these must be synchronized.

In the condition of t3, since the rotation speed Ne of engine 1 is still at the rotation speed for the first speed, engine 1 is in condition where the rotation speed is higher than the rotation speed that is appropriate for the second speed. Engine 1 thus tends to generate torque in the direction of accelerating counter shaft 12 as its own rotation speed is slowed down. However, since low gear 21 is still engaged and 2 WAY 39 is set to the reverse side, the torque that tends to accelerate counter shaft 12 becomes consumed for the acceleration of motor 2 via low gear 21 (t3→t4). The excess energy that is generated when the engine rotation speed Ne drops to the rotation speed for the second speed is thus absorbed as the energy that accelerates motor 2, becomes the torque that decelerates counter shaft 12 via planetary gear 20, and cancels out the torque in the acceleration direction, thereby alleviating the shock in the shifting process.

If the inertia torque of the driving parts of the engine 1 side and the inertia torque of the driving parts of the motor 2 side in the interval t3→t4 are in a relationship where they cancel each other out completely, the shift shock can be reduced or eliminated without having to generate a torque at motor 2 in particular. Meanwhile, if there is difference in the inertia variation amounts of these parts, the shift shock can be reduced or eliminated by making motor 2 generate a positive torque Tm or by controlling motor 2 to generate a negative torque Tm for regeneration in accordance to the difference (S116). Since the control amount of this torque Tm can be determined priorly from data on the inertia of the driving parts of the engine 1 side, the inertia of the driving parts of the motor 2 side, and the engine rotation speed Ne in the above-described condition of the second speed, a map may be prepared according to power transmission device or calculation may be performed each time for the determination of the control amount.

Figure 5:
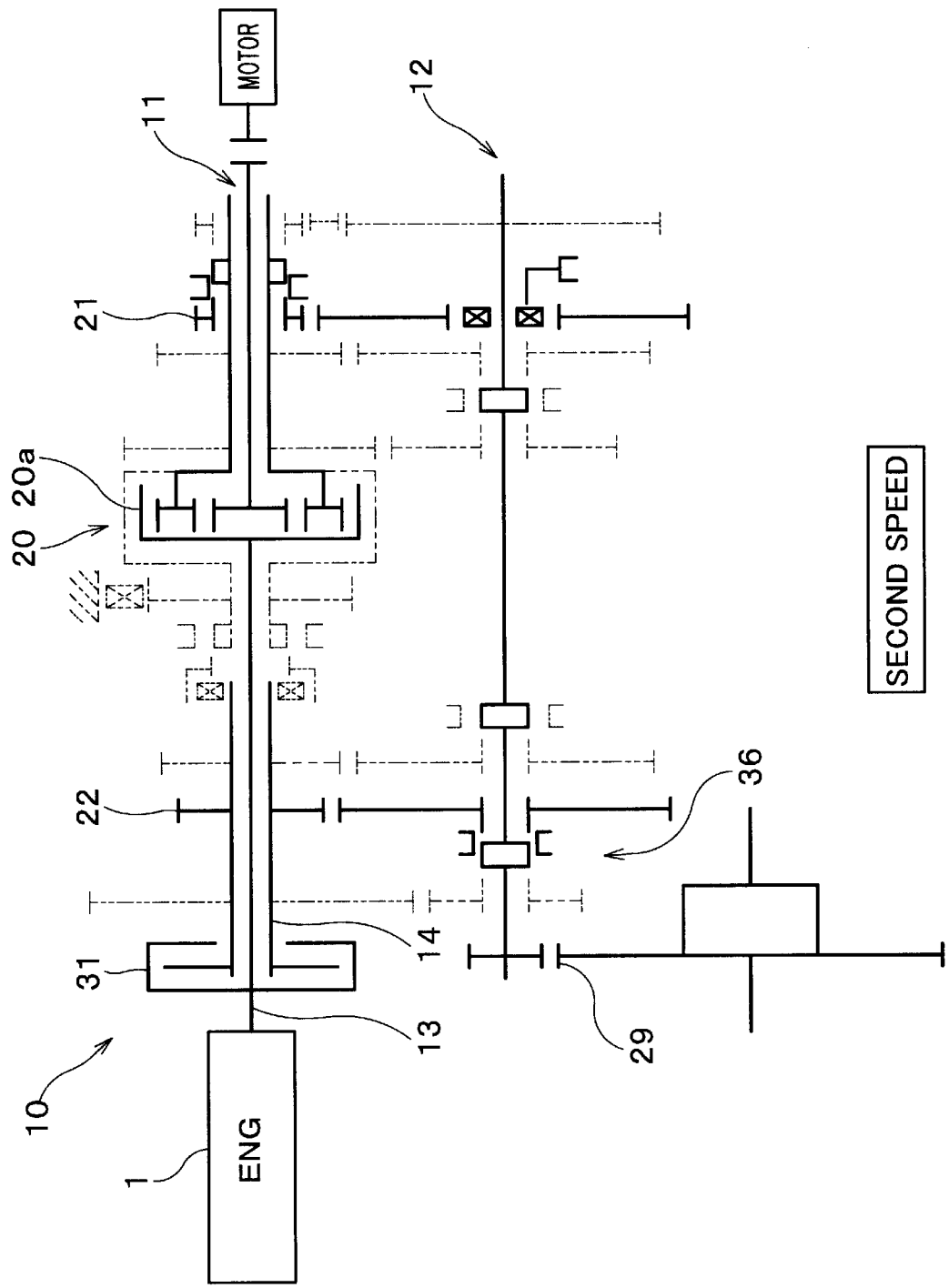
FIG. 5 is a diagram, which shows the gear engagement when the AMT power transmission device is in the second speed condition.

The process of shifting to the second speed is completed by the above operation. The condition of engagement of the gears at this time is shown in FIG. 5. When after the completion of shifting to the second speed, acceleration is performed as it is, since low gear 21 is engaged, the rotation of motor 2 increases in accordance to the acceleration of engine 1 (t4→t5).

<Second Speed→Third Speed>

Figure 13:
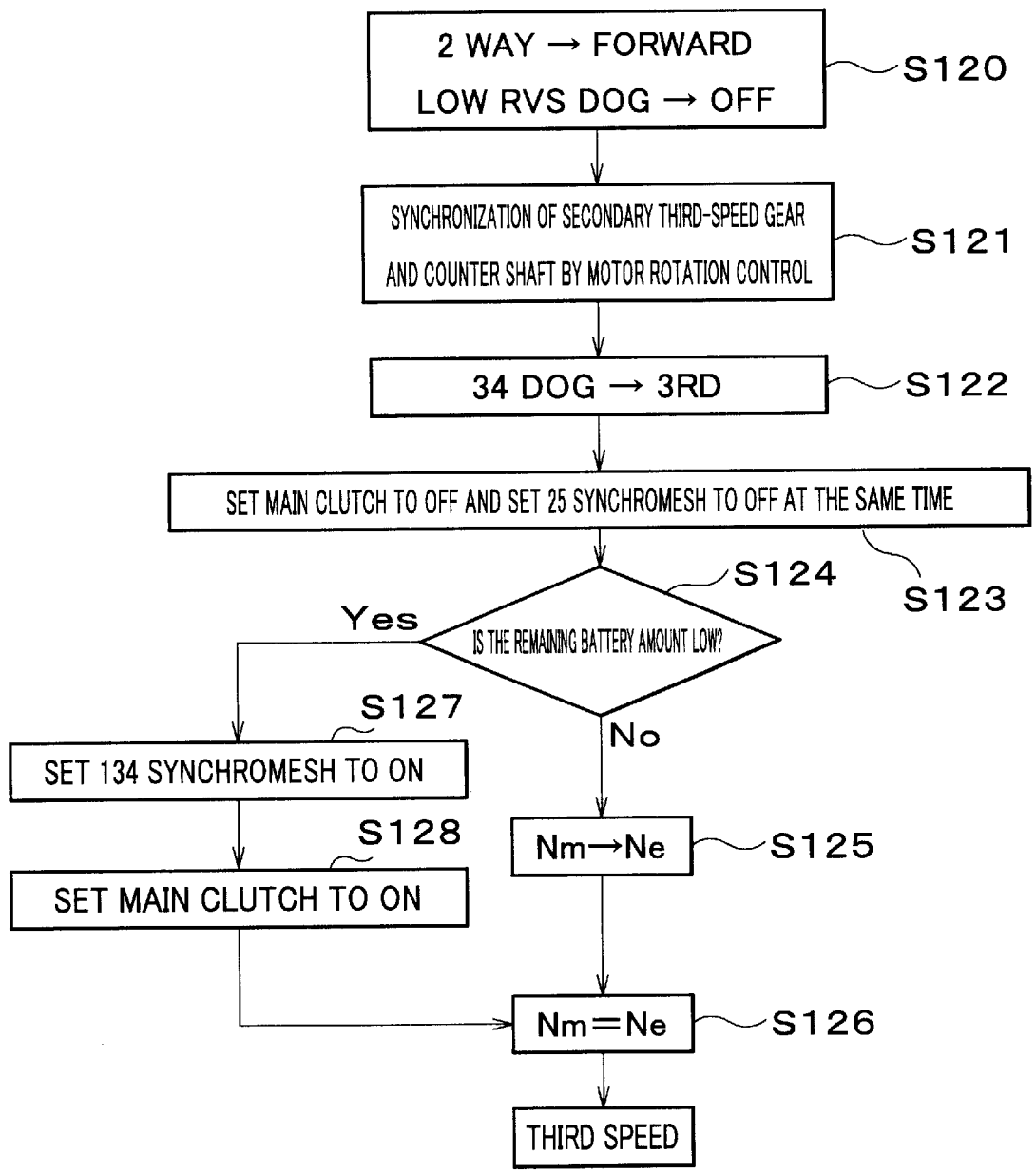
FIG. 13 is a flowchart, which shows the control flow of the AMT power transmission device in the process of shifting from second speed to third speed.

The shifting operation from the second speed to the third speed shall now be described with reference to FIG. 10 and the flowchart of FIG. 13.

Figure 6:
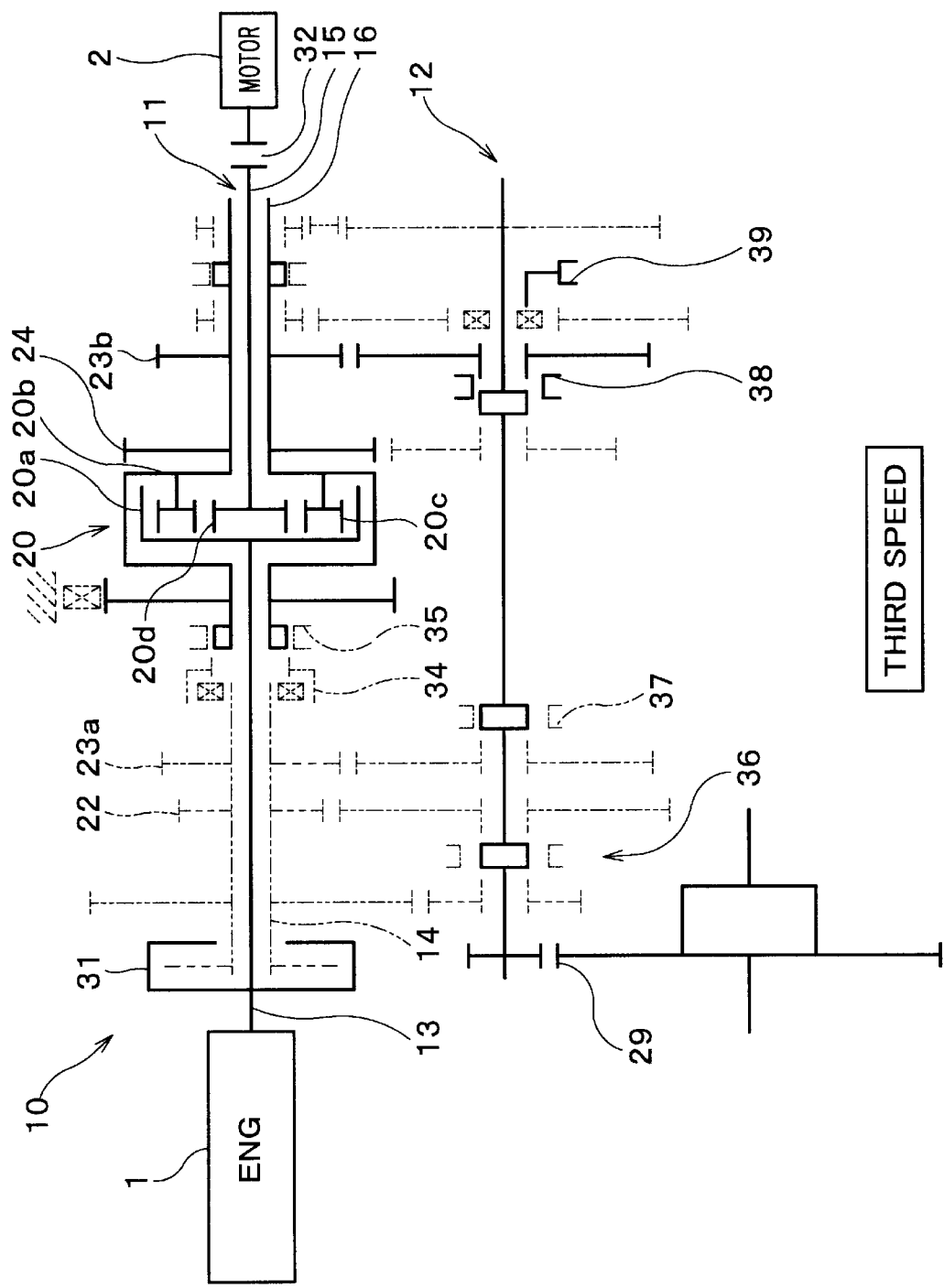
FIG. 6 is a diagram, which shows the gear engagement when the AMT power transmission device is in the third speed condition.

At t5, 2 WAY 39 is switched to forward and at the same time, low gear 21 is set to OFF (S120). Here, 2 WAY 39 is switched to forward to eliminate the friction loss due to rotation of low gear 21 and thereby improve the efficiency of power transmission, and this switch over thus does not have to be performed necessarily. By the setting of low gear 21 to OFF, the motor rotation is slowed down, and the motor is controlled so that the speed of secondary third-speed gear 23b will be synchronized with the rotation of counter shaft 12 (S121). When the synchronization of secondary third-speed gear 23b has been completed (t5), 34 DOG 38 is shifted to the secondary third-speed gear 23b side (S122) to complete the preparation for the shifting to third speed. The torque of motor 2 is controlled and at the point at which a torque corresponding to the third-speed output is applied, main clutch 31 is disengaged and, at the same time, 25 synchromesh 36 is disengaged (S123). The engagement of the gears at this time is shown in FIG. 6.

At this instant, whereas the parts from carrier 20b to secondary third-speed gear 23b and counter shaft 12 are at the rotation speed of the third speed, the rotation speed of engine 1 will still be at that of the second speed. If the remaining battery amount is sufficient (S124), the motor rotation speed Nm is made to approach the engine rotation speed Ne by motor drive control (S125). The process of shifting to the third speed is completed at the point at which the motor rotation speed Nm and the engine rotation speed Ne are matched (S126). For this process, since a time limit defined by the heat capacity is not imposed on the shifting by the hydraulic clutch, a shifting process that takes some amount of time to complete can be carried out by motor 2 to enable reduction or elimination of the shift shock.

In the case where the remaining battery amount is low (S124), 134 synchromesh 35 is set to ON (S127) and then main clutch 31 is set to ON (S128) to mechanically match the motor rotation speed Nm and the engine rotation speed Ne (S126).

As has been described above, in the process of shifting from the second speed to the third speed, the shock that occurs during shifting can be reduced or eliminated by the canceling out of the inertia torque of the driving parts of the engine 1 side and the inertia torque of the driving parts of the motor 2 side. In the case where there is a difference in the inertia variation amounts of the respective parts, control of the motor torque Tm and the engine torque Te in accordance to the difference can be performed.

<Third Speed→Fourth Speed>

Figure 14:
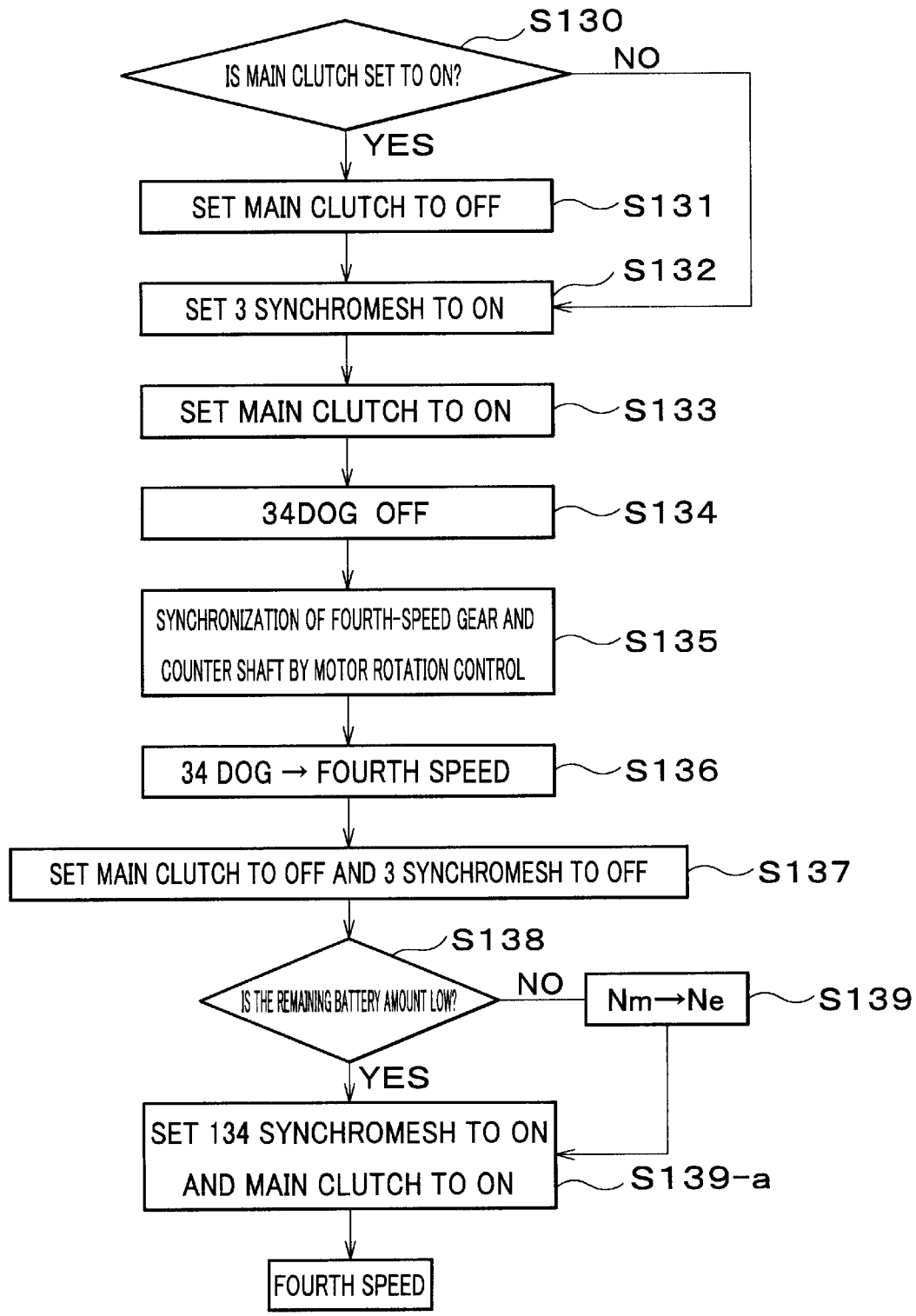
FIG. 14 is a flowchart, which shows the control flow of the AMT power transmission device in the process of shifting from third speed to fourth speed.

The shifting operation from the third speed to the fourth speed shall now be described with reference to FIG. 10 and the flowchart of FIG. 14.

Whether or not main clutch 31 is ON is judged (S130), and if main clutch 31 is ON, it is set to OFF (S131) and if main clutch 31 is OFF, main clutch 31 is left as it is. 3 synchromesh 37 is then set to ON (S132). Main clutch 31 is then engaged (S133) and 34 DOG 38 is set to OFF (S134). By the above, the third-speed gear is switched from the secondary shaft side to the primary shaft side.

Figure 7:
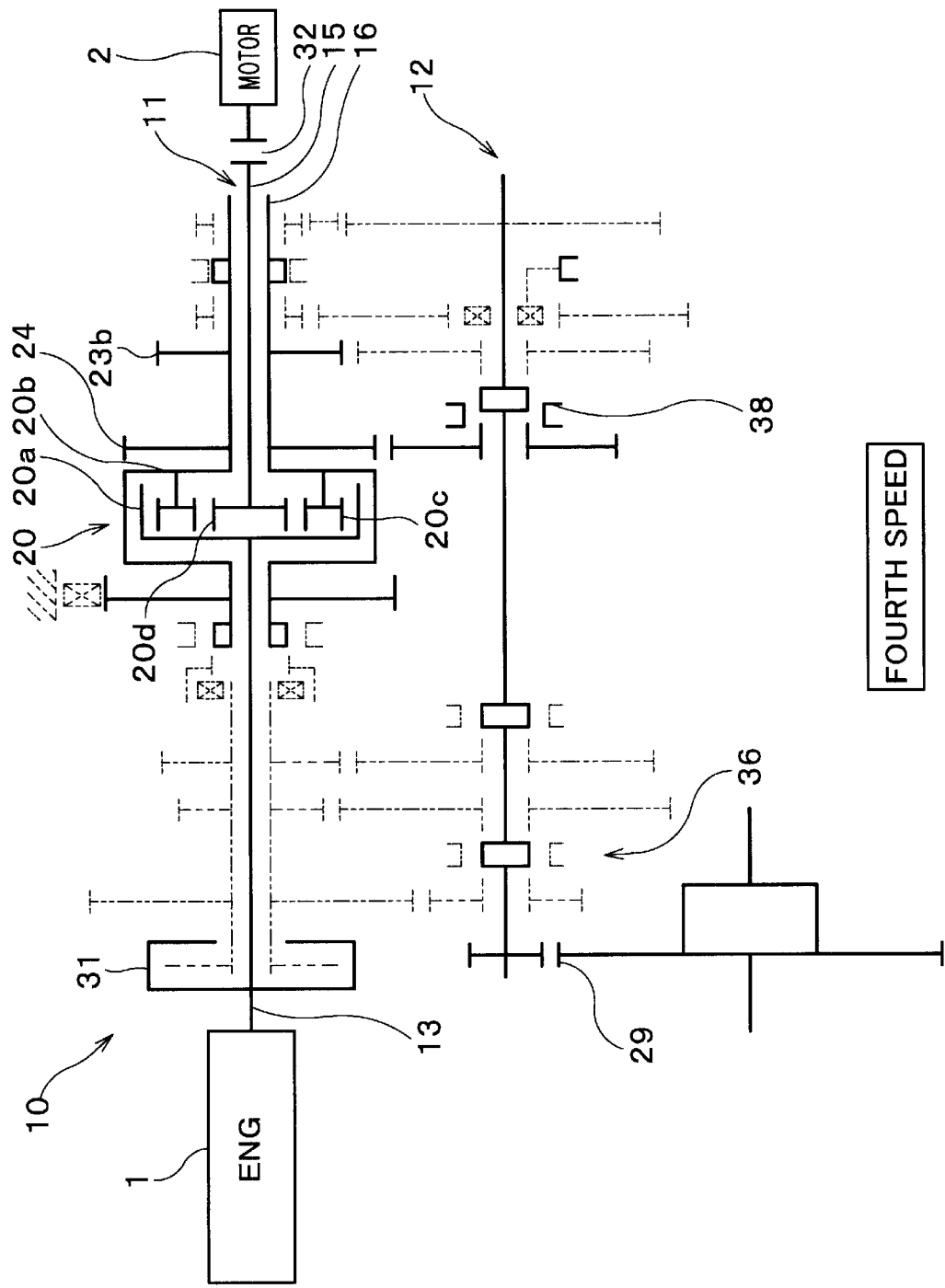
FIG. 7 is a diagram, which shows the gear engagement when the AMT power transmission device is in the fourth speed condition.

Motor 2 is then controlled so that fourth-speed gear 24 will be synchronized with counter shaft 12 (S135). When synchronization is accomplished, 34 DOG 38 is shifted to the fourth-speed gear 24 side (S136). At the point at which the torque corresponding to the fourth-speed output is applied to fourth-speed gear 24 by motor control, main clutch 31 is set to OFF and at the same time, 3 synchromesh 37 is set to OFF (S137). The condition of engagement of the gears at this time are shown in FIG. 7.

At this instant, whereas the parts from carrier 20b to fourth-speed gear 24 and counter shaft 12 have been switched to the fourth speed, the rotation speed of engine 1 will still be at that of the third speed. If the remaining battery amount is sufficient (S138), the motor rotation speed Nm is made to approach the engine rotation speed Ne by motor drive control (S139). The process of shifting to the fourth speed is completed at the point at which the motor rotation speed Nm and the engine rotation speed Ne are matched. For this process, since a time limit defined by the heat capacity is not imposed on the shifting by the hydraulic clutch, a shifting process that takes some amount of time to complete can be carried out by motor 2 to enable reduction or elimination of the shift shock.

In the case where the remaining battery amount is low (S138), 134 synchromesh 35 is set to ON and then main clutch 31 is set to ON (S139-a) to mechanically match the motor rotation speed Nm and the engine rotation speed Ne (S139).

As has been described above, in the process of shifting from the third speed to the fourth speed, the shock that occurs during shifting can be reduced or eliminated by the canceling out of the inertia torque of the driving parts of the engine 1 side and the inertia torque of the driving parts of the motor 2 side. In the case where there is a difference in the inertia variation amounts of the respective parts, control of the motor torque Tm and the engine torque Te in accordance to the difference can be performed.

After the engine rotation and motor rotation have been synchronized, 134 synchromesh 35 is set to ON and then main clutch 31 is set to ON (S139-a). Ring gear 20a and carrier 20b are thereby made to rotate integrally. The shock that occurs in the process of engagement of main clutch 31 is extremely small since the engagement is performed after the rotations have been synchronized. If the remaining battery amount is sufficient, the rotation of motor 2 may be continued and kept synchronized with the engine rotation.

<Fourth Speed→Fifth Speed>

Figure 15:
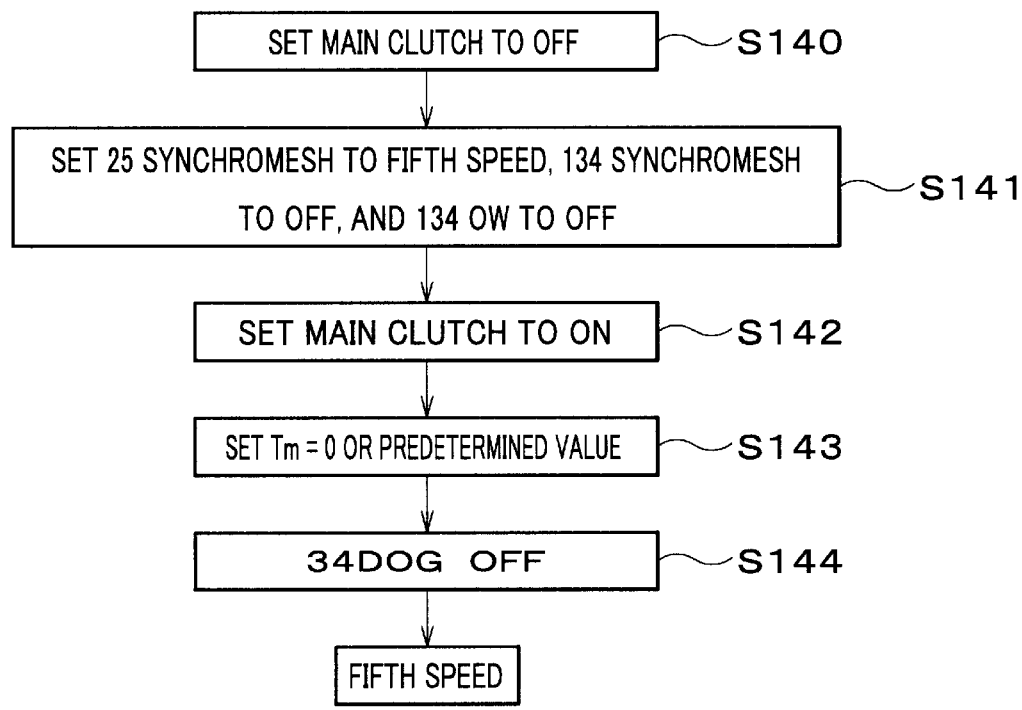
FIG. 15 is a flowchart, which shows the control flow of the AMT power transmission device in the process of shifting from fourth speed to fifth speed.

The shifting operation from the fourth speed to the fifth speed shall now be described with reference to the flowchart of FIG. 15 and FIG. 10.

For the shift from the fourth speed to the fifth speed, main clutch 31 is set to OFF (S140), 25 DOG 36 is shifted to the fifth speed side, and at the same time, 134 synchromesh 35 and 134 O/W 34 are set to OFF (S141). When the above shifting operation has been completed, main clutch 31 is re-engaged (S142). Since in this condition, the driving parts of the engine 1 side and the driving parts of the motor 2 side are still at the fourth speed, these must undergo the transition to the rotation speed of the fifth speed. Whereas by the dropping of the rotation speed, the driving parts of the engine 1 side apply an inertia torque that acts to accelerate counter shaft 12, the driving parts of the motor 2 side, which is connected via planetary gear set 20, absorb the above mentioned inertia torque as the rotation speed increases. If the inertia torque of the driving parts of the engine 1 side and the inertia torque of the driving parts of the motor 2 side are in a relationship wherein they cancel each other out completely, the shift shock will be eliminated even if torque control of motor 2 is not performed in particular, and if there is a difference in the inertia torques of the parts, the shift shock can be reduced or eliminated by controlling motor 2 to generate a torque corresponding to the difference (S143).

Figure 8:
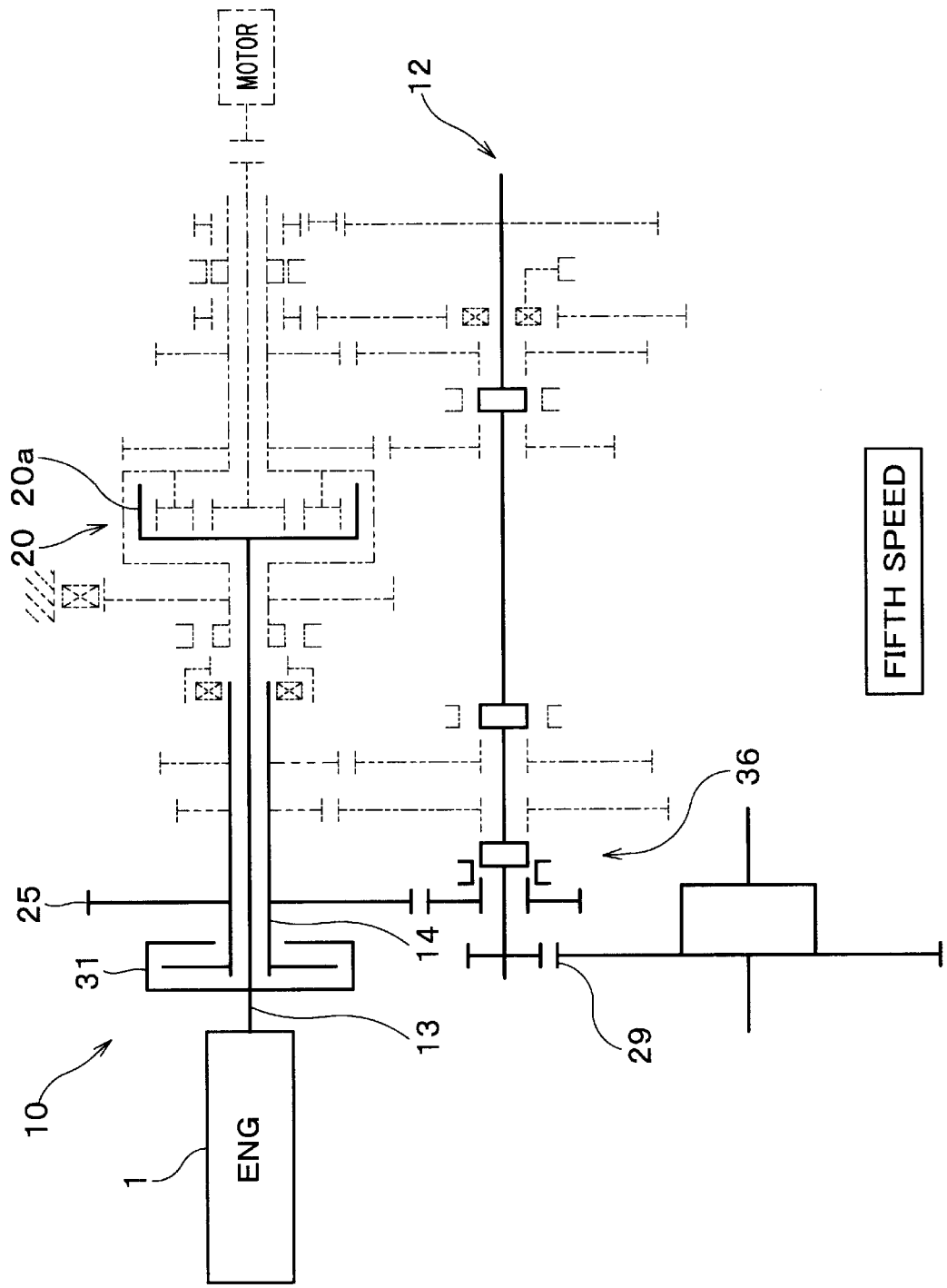
FIG. 8 is a diagram, which shows the gear engagement when the AMT power transmission device is in the fifth speed condition.

When the respective parts have completed the transition to the fifth speed, 34 DOG 38 is set to OFF (S145) and the process of shifting to the fifth speed is completed. The engagement of the gears at this time is shown in FIG. 8.

<Reverse>

Figure 9:
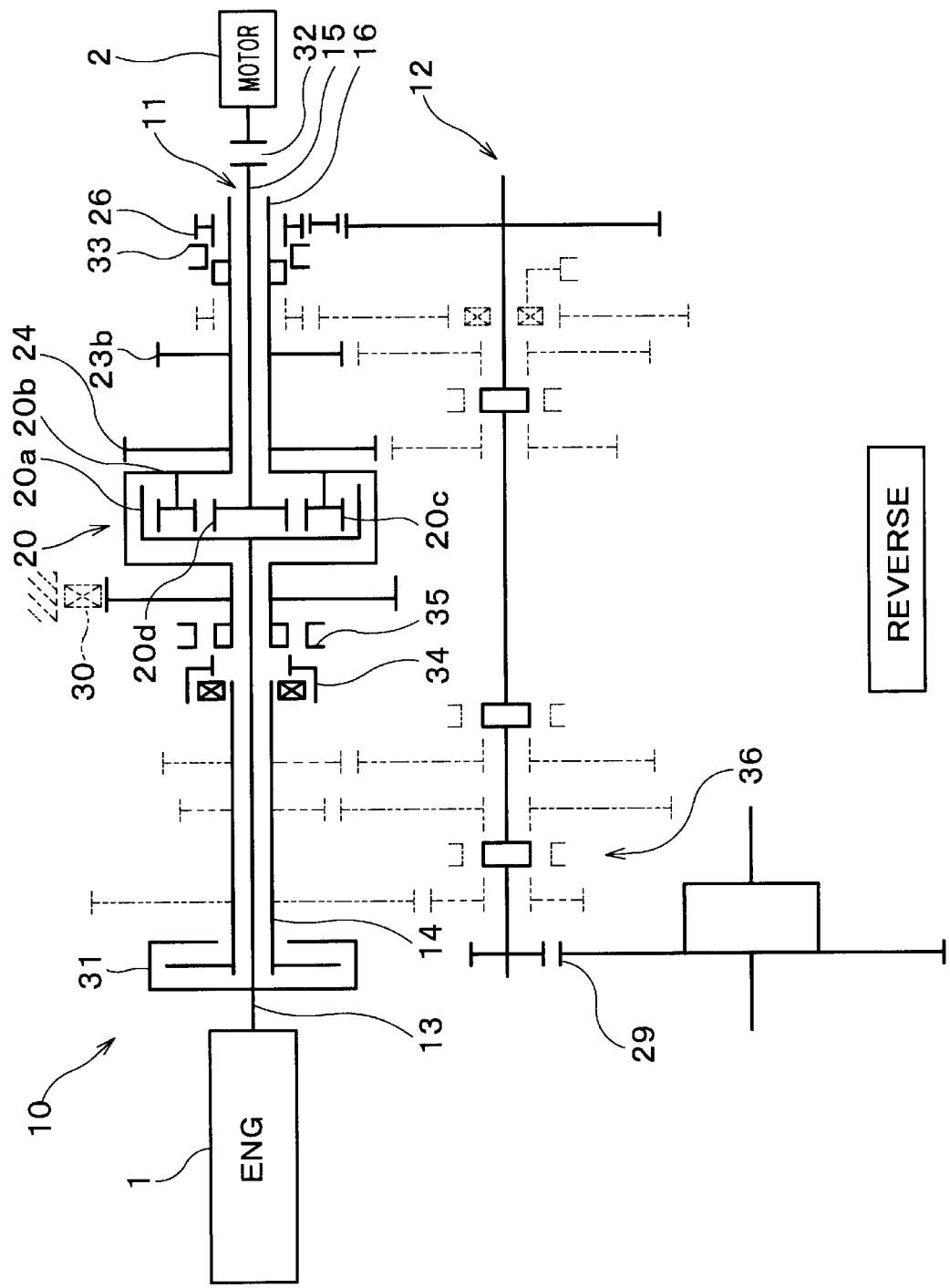
FIG. 9 is a diagram, which shows the gear engagement when the AMT power transmission device is in the reverse condition.

The gear operations that are carried out in the process of making the vehicle move in reverse by means of ATM power transmission device 10 shall now be described with reference to FIG. 9.

First, when Low RVS DOG 33 is set to the reverse side from the stopped condition, the reverse gear is set. During stoppage, motor 2 is rotated in reverse with respect to engine 1 and carrier 20b will not be rotating. By gradually decelerating motor 2 and then making it rotate forward, carrier 20b is made to rotate and counter shaft 31 is made to rotate in reverse via reverse gear 26. The vehicle may thus be made to move in reverse without the provision of a takeoff clutch mechanism and a torque converter mechanism.

If the remaining battery amount is not sufficient, takeoff by clutch control can also be performed by setting 134 synchromesh 35 to ON.

Also, in the case where the vehicle is on a rising slope in the condition where engine 1 is stopped, since starter one-way clutch 30 prevents reverse rotation, the sliding down of the vehicle will be prevented as long as reverse gear 26 is engaged. Excess creep power will thus not be consumed.

As has been described, with the AMT power transmission device of this invention, the shock during shifting can be reduced in a vehicle in which an engine and motor are connected via a planetary gear by making the inertia torque of the driving parts at the engine side be absorbed as the inertia torque of the driving parts of the motor side in the shifting process.

With the embodiment described above, if the rotation speeds can be synchronized and engagement can be accomplished successfully by control of the motor, etc., dog clutches are preferably used as Low RVS DOG 33, 34 DOG 38, 25 synchromesh 36, 134 synchromesh 35, and 3 synchromesh 37. In the case where dog clutches are used, efficient transmission of power will be enabled since there will be no slipping loss.

[4AT Power Transmission Device]

A 4-speed automatic transmission type (4AT) power transmission device of a second embodiment of this invention shall now be described.

Figure 16:
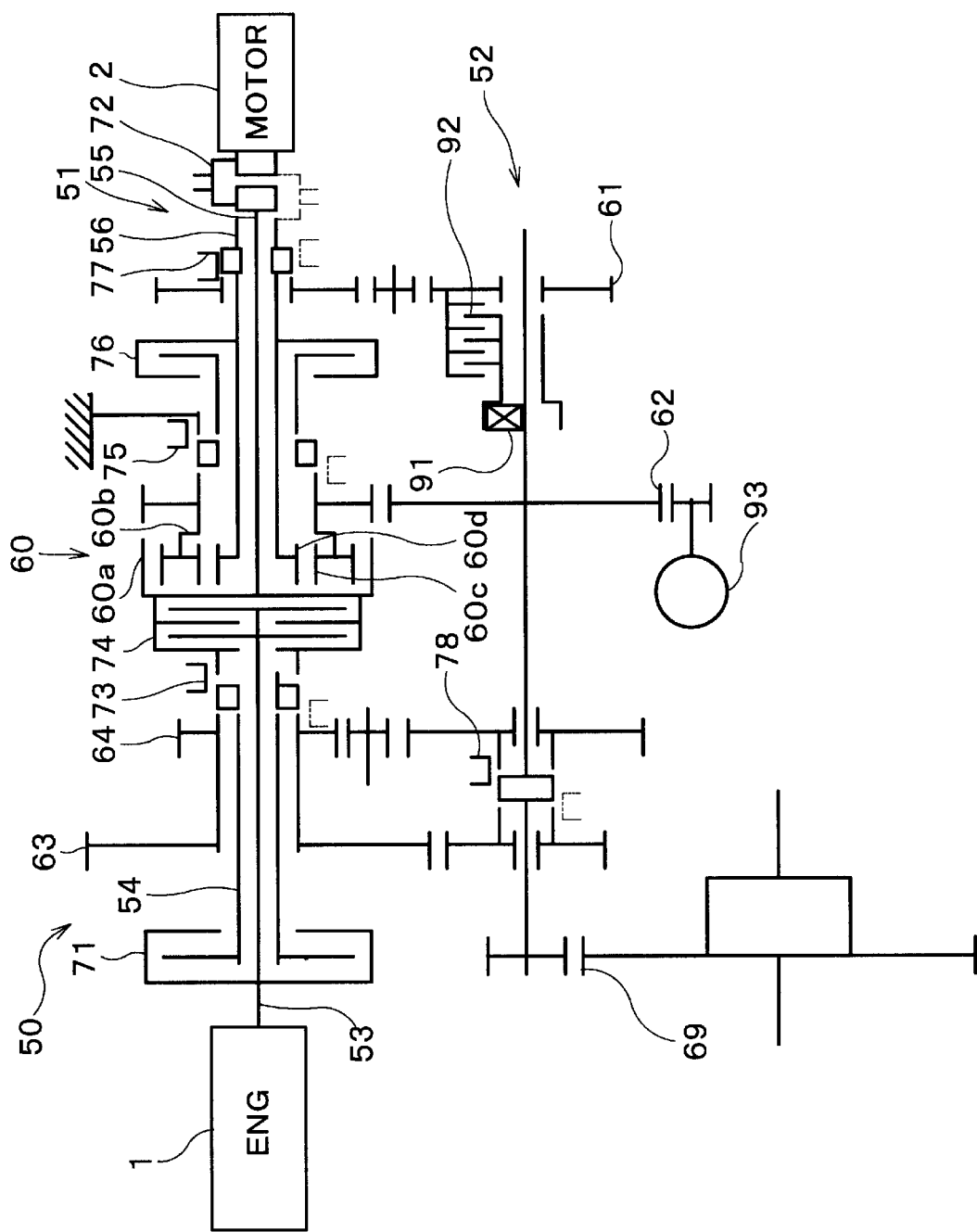
FIG. 16 is a diagram, which shows the gear arrangement of a 4AT power transmission device.

FIG. 16 is a drawing, which shows the gear arrangement of the 4AT power transmission device of the second embodiment. With the second embodiment, the parts that are practically the same as those of the first embodiment shall be provided with the same symbols and descriptions thereof shall be omitted.

In terms of basic arrangement, the 4AT power transmission device 50 of the second embodiment is comprised of a main shaft 51, on the respective ends of which are disposed engine 1 and motor 2, which are the first and second prime movers, respectively, and a counter shaft 52, which receives the power from main shaft 51 via various gears and transmits power to the driving wheel via final gear 69.

Main shaft 51 is furthermore comprised of an ENG output shaft 53, which is the output shaft of the engine, a main primary shaft (MPS) 54, a motor output shaft 55, which transmits the power of the motor via motor clutch 72, and a main secondary shaft (MSS) 56.

ENG output shaft 53 is connected via a four-speed (4TH) clutch 74, which is a wet-type clutch, to ring gear 60a of planetary gear set 60, and is arranged to transmit power to MPS 54 via a main clutch 71, which is disposed at the engine side.

MPS 54 receives the power from engine output shaft 53 via main clutch 71 and the shaft end thereof is arranged to be connected via an engine dog clutch (Eng DOG) 73 to the set comprised of a four-speed gear 63 and a reverse gear 64 or to ring gear 60a.

The connection of motor output shaft 55 or MSS 56 to motor 2 can be selected by the shifting of motor dog clutch 72.

Of the above, motor output shaft 55 receives the power of motor 2 via motor dog clutch 72 and the shaft end thereof at the engine 1 side is connected to ring gear 60a.

MSS 56 receives the power of motor 2 via motor dog clutch 72 and the shaft end thereof at the engine 1 side is connected to sun gear 60d of planetary gear set 60. MSS 56 is furthermore made connectable to a low reactor gear 61 via low reactor dog clutch (L-R DOG) 77. MSS 56 is furthermore made connectable to a 23 synchromesh 75 via a 23 main clutch 76, and is made connectable to the set comprised of carrier 60b of planetary gear set 60 and a 123 gear 62 or the ground by the selection of 23 synchromesh 75.

Planetary gear set 60 is comprised of ring gear 60a, planetary gear 60c, sun gear 60d, and carrier 60b, which transmits the revolution of planetary gear 60c to 123 gear 62. At a location where a dog clutch is used, a synchromesh may be used instead as appropriate, and at a location where a synchromesh is used, a dog clutch maybe used instead as appropriate as long as synchronization of rotation can be achieved successfully.

Counter shaft 52 is made connectable to main shaft 51 by low reactor gear 61, 123 gear 62, fourth-speed gear 63, or reverse gear 64 and is also enabled to transmit power to the axle shaft via final gear 69. Counter shaft 52 is connected to engine 1 via fourth-speed gear 63 or reverse gear 64 and corresponds to being the output shaft as set forth in the claims. Fourth-speed gear 63 and reverse gear 64 correspond to being the first transmission part as set forth in the claims.

Low reactor gear 61 is made connectable to counter shaft 52 via a viscous (VC) 92 and furthermore via 12 one-way clutch 91 upon shifting of a reverse dog clutch (RVS DOG) 79. 12 one-way clutch 91 receives the input from the drive shaft side and is enabled to transmit power only to the forward motion side.

123 gear 62 receives the power of carrier 60b and is always connected to counter shaft 52. 123 gear 62 is also connected to oil pump 93 and enables the circulation of oil.

Fourth-speed gear 63 and reverse gear 64 are arranged so that one of either will be connected to counter shaft 52 by the shifting of a 4R dog clutch (4R DOG) 78.

The operations of the 4AT power transmission device 50 with the above-described arrangement shall now be described.

<Takeoff•Startup>

Figure 22:
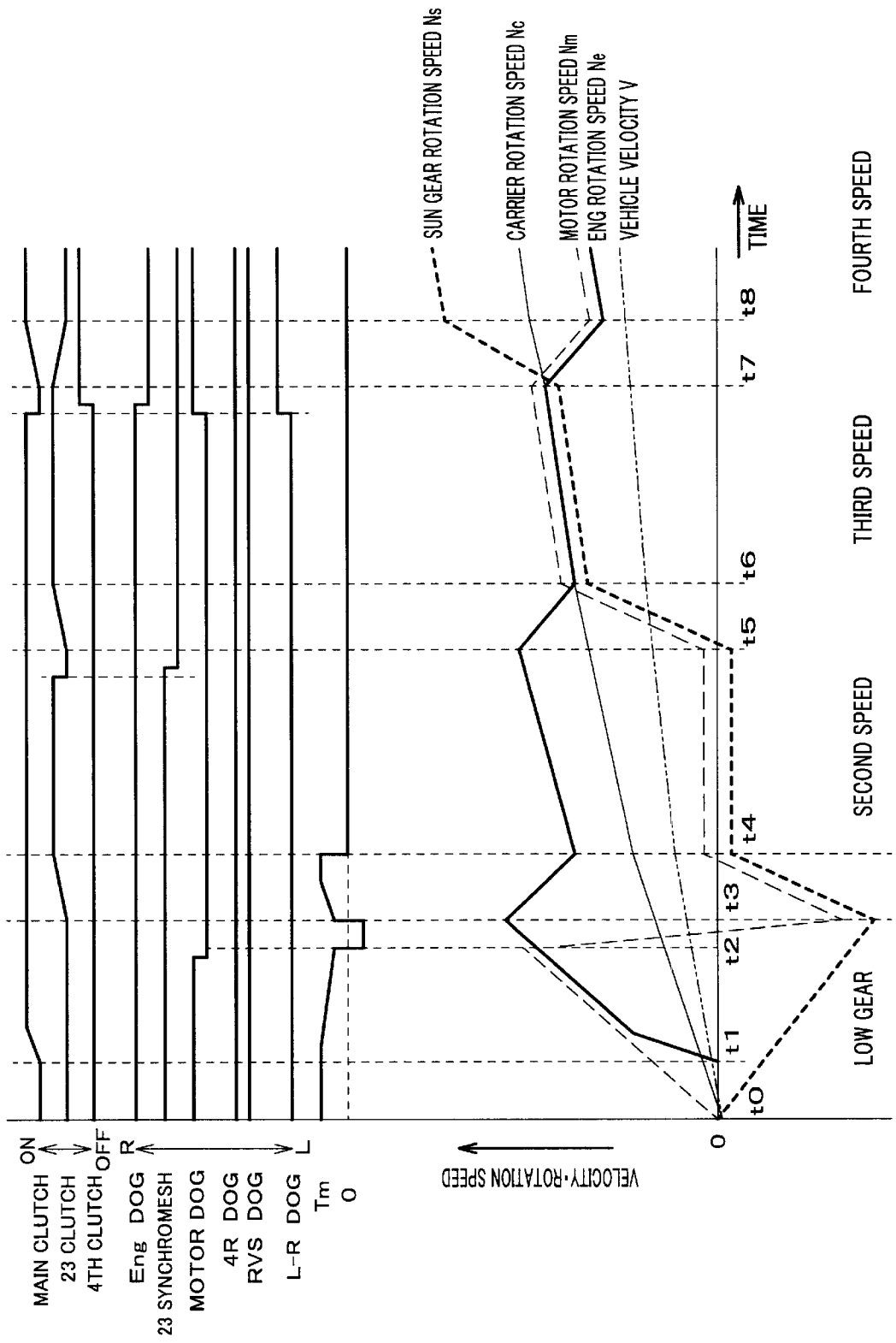
FIG. 22 are graphs, which show the speeds and shift conditions of the various elements when a vehicle equipped with the 4AT power transmission device is in the acceleration process.
Figure 23:
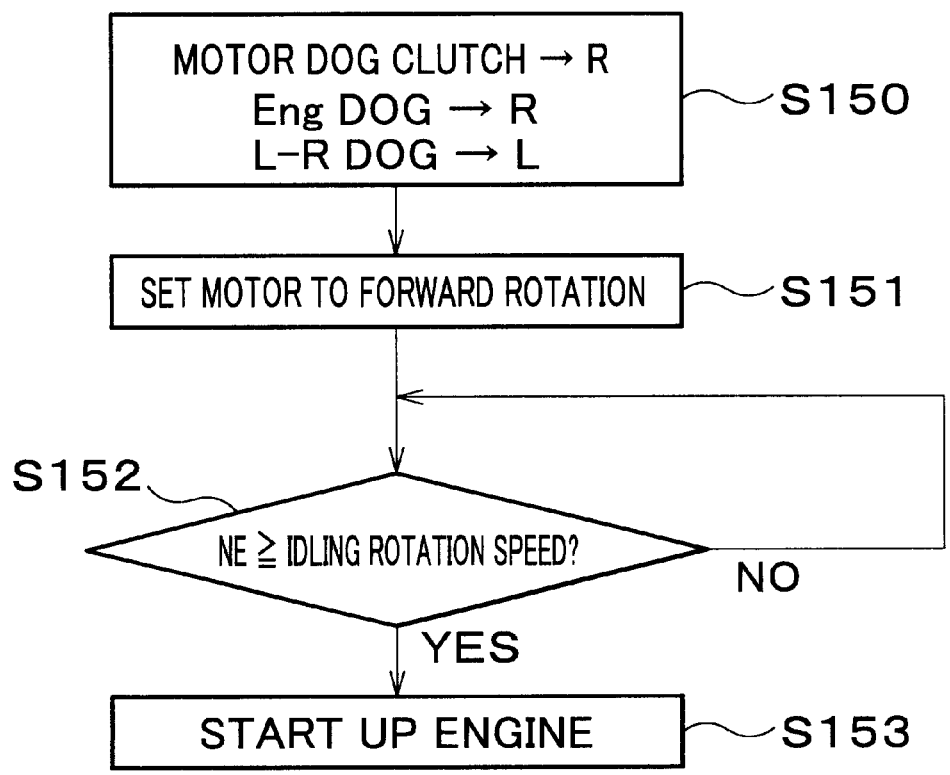
FIG. 23 is a flowchart, which shows the control flow of the 4AT power transmission device in the takeoff process.

FIG. 23 shows the control flow in the takeoff process of the 4AT power transmission device and FIG. 22 shows the selection of gears and the speeds of the respective elements in the 4AT power transmission device as a vehicle is accelerated. The graphs at the lower side of FIG. 22 illustrate the variations of the engine rotation speed Ne (thick solid line), vehicle velocity V (alternate long and two short dashes line), motor rotation speed Nm (broken line), sun gear rotation speed Ns (dotted line), and carrier rotation speed Nc (thin solid line) in the acceleration process and the upper side shows the ON/OFF conditions of the respective clutches in correspondence to the graphs at the lower side. The symbols t1, t2, . . . indicate the motor 2 and are used in the description below.

First, the takeoff control of the vehicle shall be described with reference to FIG. 22 and the flowchart of FIG. 23.

For takeoff, from the condition where all clutches are set to OFF, motor dog clutch 72 is shifted to the right (R) side in FIG. 16, Eng DOG 73 is shifted to the right (R) side, L-R DOG 77 is shifted to the left (L) side (S150) and motor 2 is made to rotate forward (S151). The ring gear 60a, which is connected to motor 2, thus rotates forward, sun gear 60d rotates in reverse, carrier 60b rotates forward, and counter shaft 52 rotates forward so that the vehicle takes off (t0 →t1).

Figure 17:
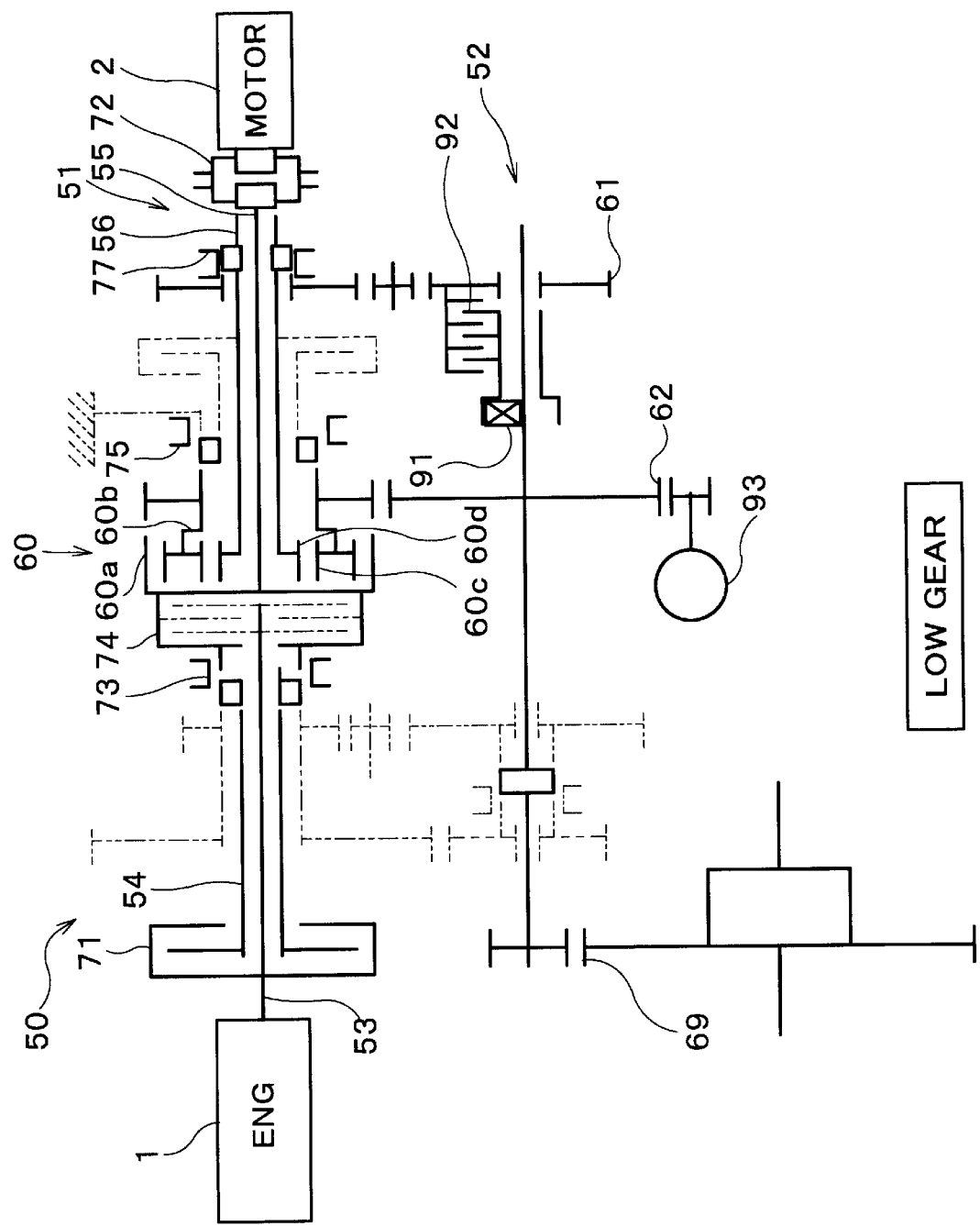
FIG. 17 is a diagram, which shows the gear engagement when the 4AT power transmission device is in the low gear condition.

When the rotation speed Nmps of MPS 54, which is connected to ring gear 60a, has become equal to or greater than the idling rotation speed (S152), main clutch 71 is engaged gradually and the engine is started (S153, t1). In this condition, the transition to the low gear condition is completed and the engagement of the gears will be as shown in FIG. 17.

With 4AT power transmission device 50, since engine 1 is thus started after making the vehicle take off from the stopped condition by means of motor 2, fuel will not be consumed by unnecessary idling.

The startup of engine 1 and idling while in the stopped condition can be carried out by setting L-R DOG 77 to OFF in the above-described takeoff operation. By using motor 2 as a power generator after the startup of engine 1, battery 6 can be charged when the remaining battery amount has decreased, even when the vehicle is in the stopped condition.

<Low→Second Speed>

Figure 24:
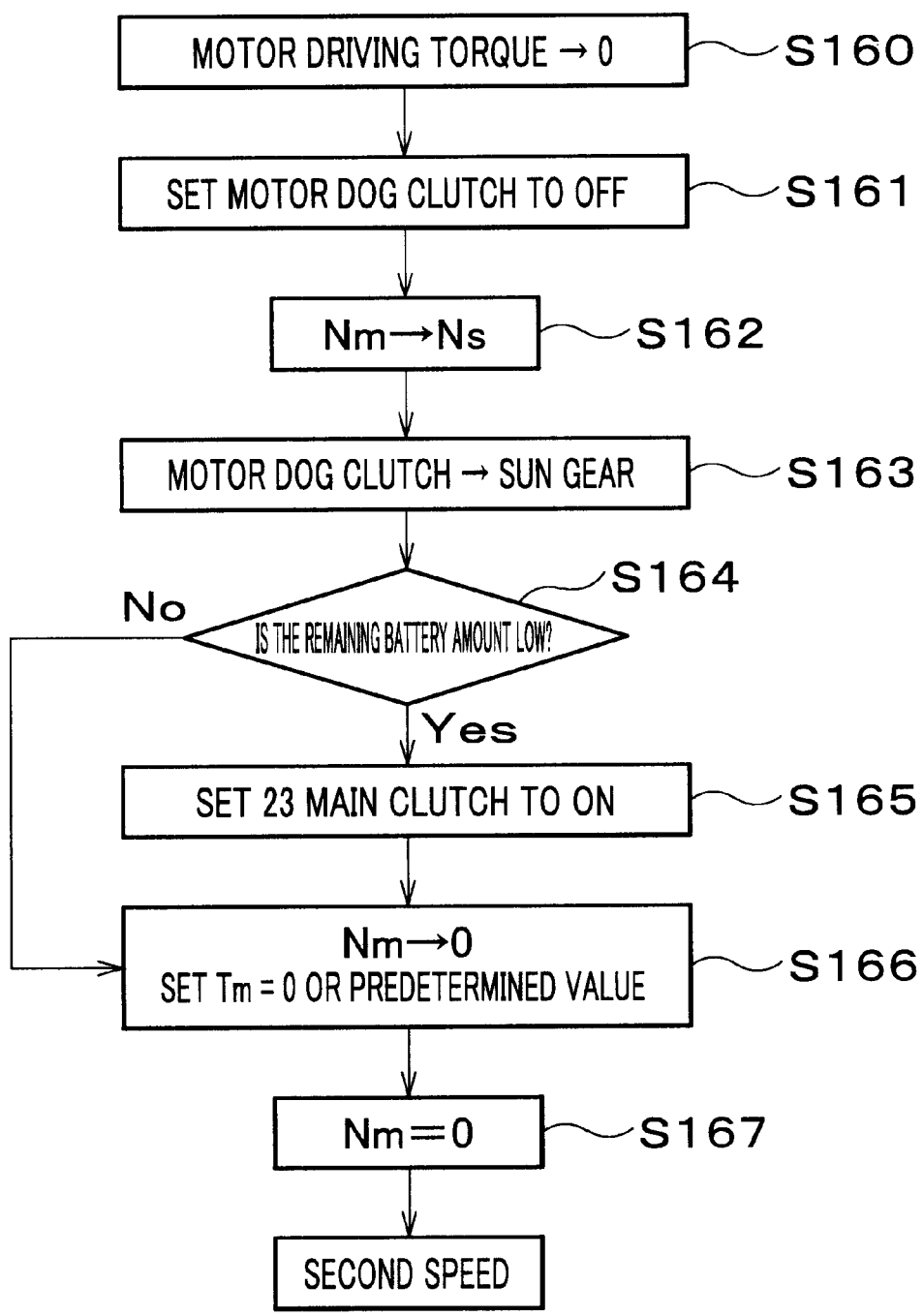
FIG. 24 is a flowchart, which shows the control flow of the 4AT power transmission device in the process of shifting from low speed to second speed.

The shifting operation from low speed to second speed shall now be described with reference to FIG. 22 and the flowchart of FIG. 24.

Prior to shifting from low speed to second speed, the driving torque of motor 2 is set to 0 (S160), motor dog clutch 72 is disengaged from motor output shaft 55, which is connected to ring gear 60a, and thereby set to OFF (S161), and after controlling motor 2 to match the motor rotation speed Nm with the sun gear rotation speed Ns (S162), motor dog clutch 72 is engaged with sun gear 60d to switch the motor out put to sun gear 60d (S163, t2→t3). The driving torque of motor 2 is set to 0 to facilitate the disengagement of motor dog clutch 72.

Though with regard to the engagement of gears, the condition at this point is the second-speed condition, with regard to the rotation speed of engine 1, the rotation speed is still high. Thus if the remaining battery amount is sufficient (S164), motor 2 is controlled and the rotation of motor 2 is accelerated in the forward rotation direction to bring the rotation speed of motor 2 close to 0 (t4, S166). If in this case, the remaining battery amount is not sufficient (S164), 23 synchromesh 75 maybe set to the ground side (S165), and the 23 main clutch 76 that has been grounded may be engaged gradually to raise the rotation of motor 2 and bring the rotation speed close to 0 (S166). When the motor rotation speed Nm becomes 0 (S167), the process of shifting from low speed to second speed is completed.

Figure 18:
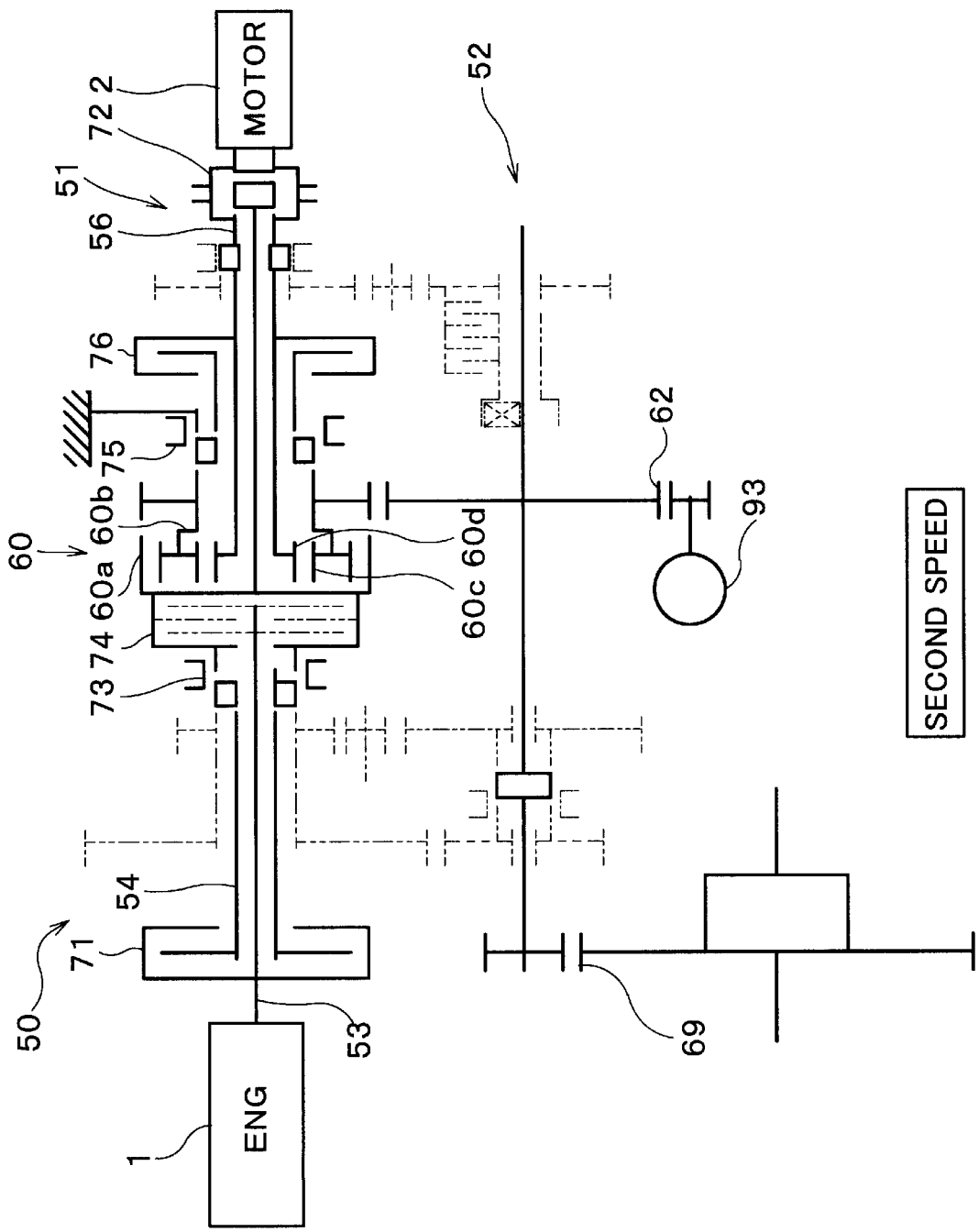
FIG. 18 is a diagram, which shows the gear engagement when the 4AT power transmission device is in the second speed condition.

FIG. 18 shows the engagement of the gears at this time.

With the control of shifting by motor torque, since a limit that is due to the heat capacity is not placed in the shifting time of the shifting by the hydraulic clutch, and the shifting time can thus be made long, the shift shock can be reduced in proportion to the shifting time.

During travel in the second speed, though sun gear 60d may be kept stopped by means of 23 main clutch 76, which has grounded, depending on the operation range of engine 1, the rotation of sun gear 60d may be controlled by means of motor 2 to maintain the operation range of engine 1 at a high-efficiency range.

<Second Speed→Third Speed>

Figure 25:
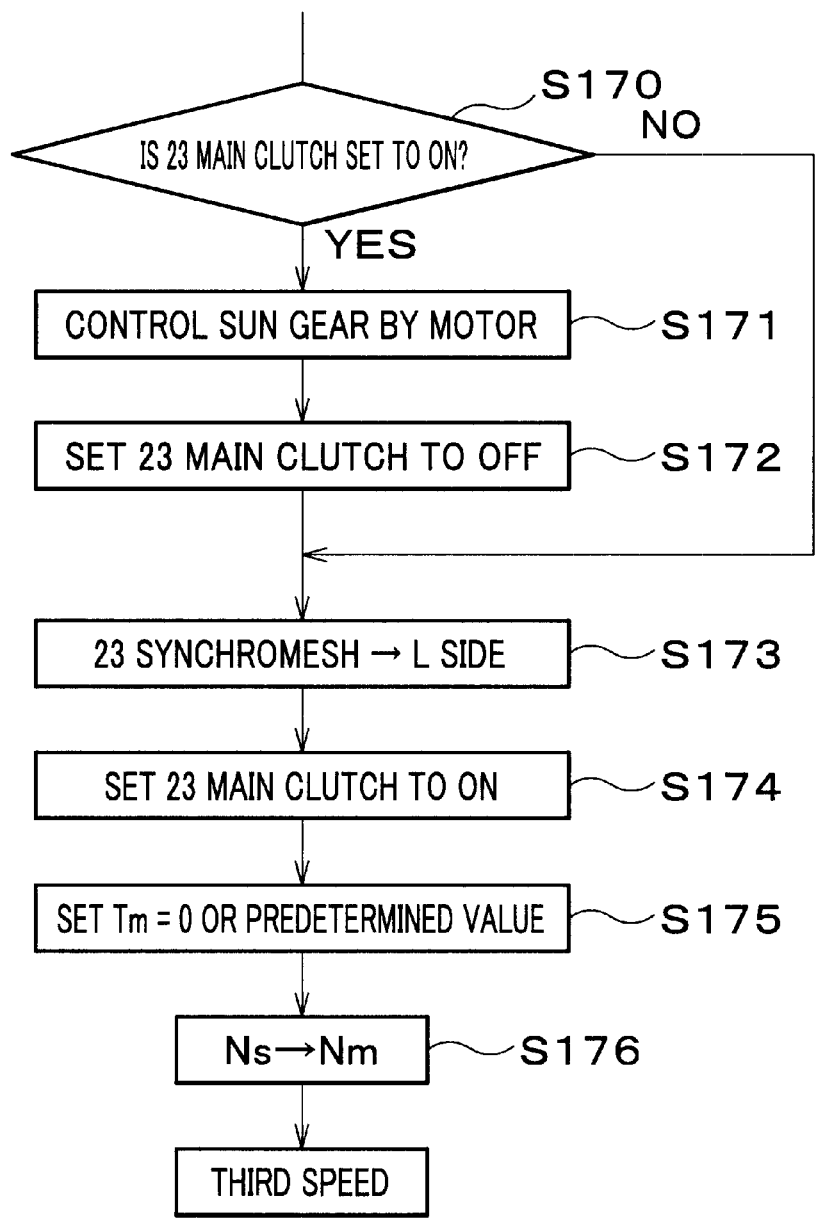
FIG. 25 is a flowchart, which shows the control flow of the 4AT power transmission device in the process of shifting from second speed to third speed.

The shifting operation from second speed to third speed shall now be described with reference to FIG. 22 and the flowchart of FIG. 25.

If sun gear 60d is kept stopped by means of 23 main clutch 76 (S170), the condition in which sun gear 60d is controlled by motor 2 is set (S171) and 23 main clutch 76 is set to OFF (S172). 23 synchromesh 75 is then shifted to the carrier 60b side (L side) (S173). If 23 main clutch 76 is already OFF (S170), 23 synchromesh 75 is directly shifted to the L side (S173).

When 23 main clutch 76 is engaged in this condition (t5, S174), the rotation speed Ns of sun gear 60d increases and becomes matched with the rotation speed Nc of carrier 60b. Meanwhile, since relative rotation of sun gear 60d and carrier 60b will be eliminated in this process, the rotation speed of engine 1, which is connected to ring gear 60a, will also become matched. When while controlling the torque Tm of motor 2 (S175), the sun gear rotation speed Ns matches the motor rotation speed Nm (S176), 23 main clutch 76 is engaged completely to complete the process of shifting to the third speed (t6).

Figure 19:
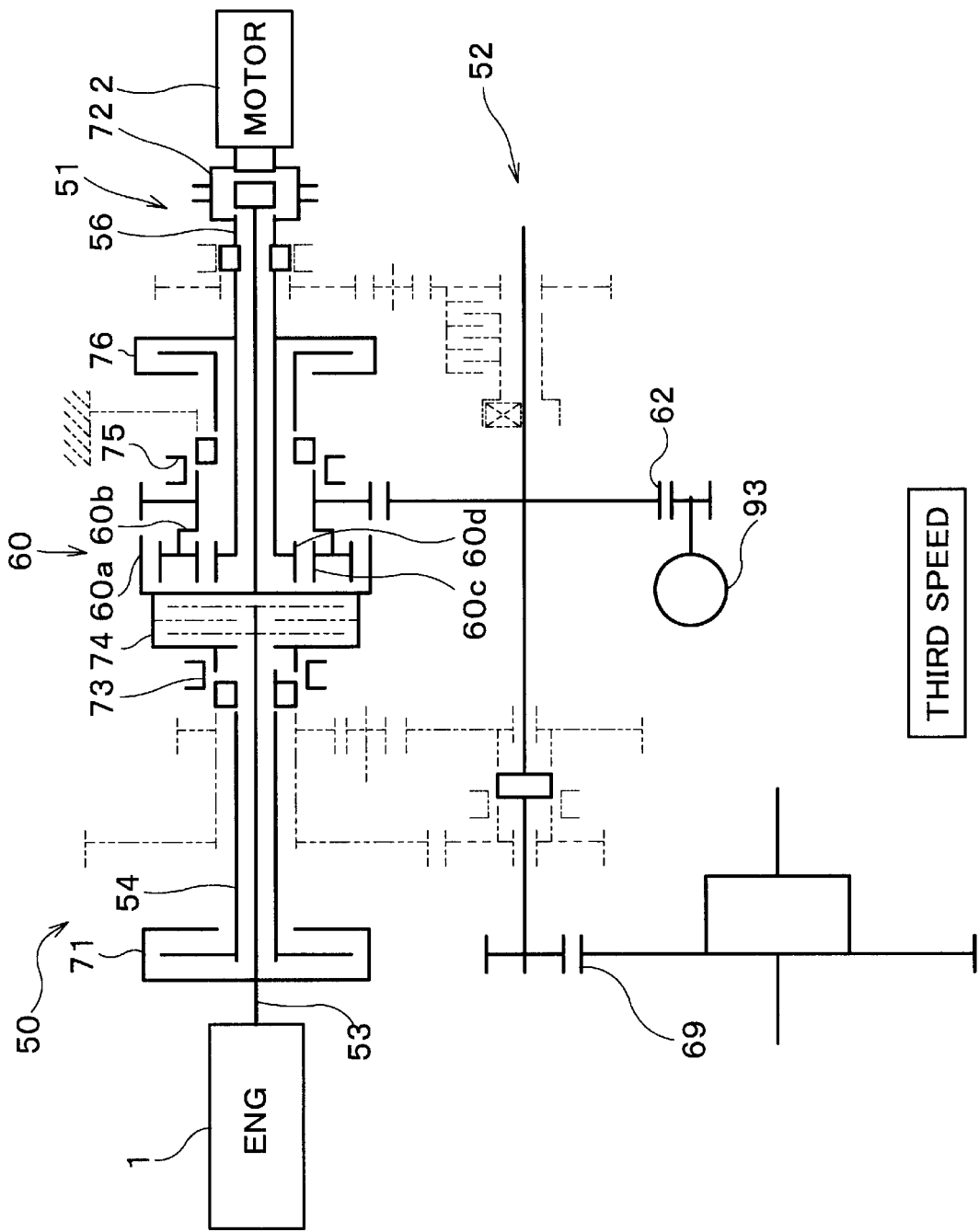
FIG. 19 is a diagram, which shows the gear engagement when the 4AT power transmission device is in the third speed condition.

The conditions of gear engagement at this time are shown in FIG. 19.

As 23 main clutch 76 is engaged in the above process, since the rotation speed of motor 2 increases while the rotation speed of engine 1 decreases, the inertia torques of both parts are in a relationship where they cancel each other out. Thus by controlling the torque Tm of motor 2 just by the amount sufficient to compensate for the difference in the inertia torques of both parts, the shift shock in the process of shifting from the second speed to the third speed can be reduced or eliminated. Also, by appropriately setting the balance of the inertia of the driving parts of the engine 1 side and the inertia of the driving parts of the motor 2 side, the inertia torques of both parts may be made to cancel each other out without having to perform torque control of motor 2.

<Third Speed→Fourth Speed>

Figure 26:
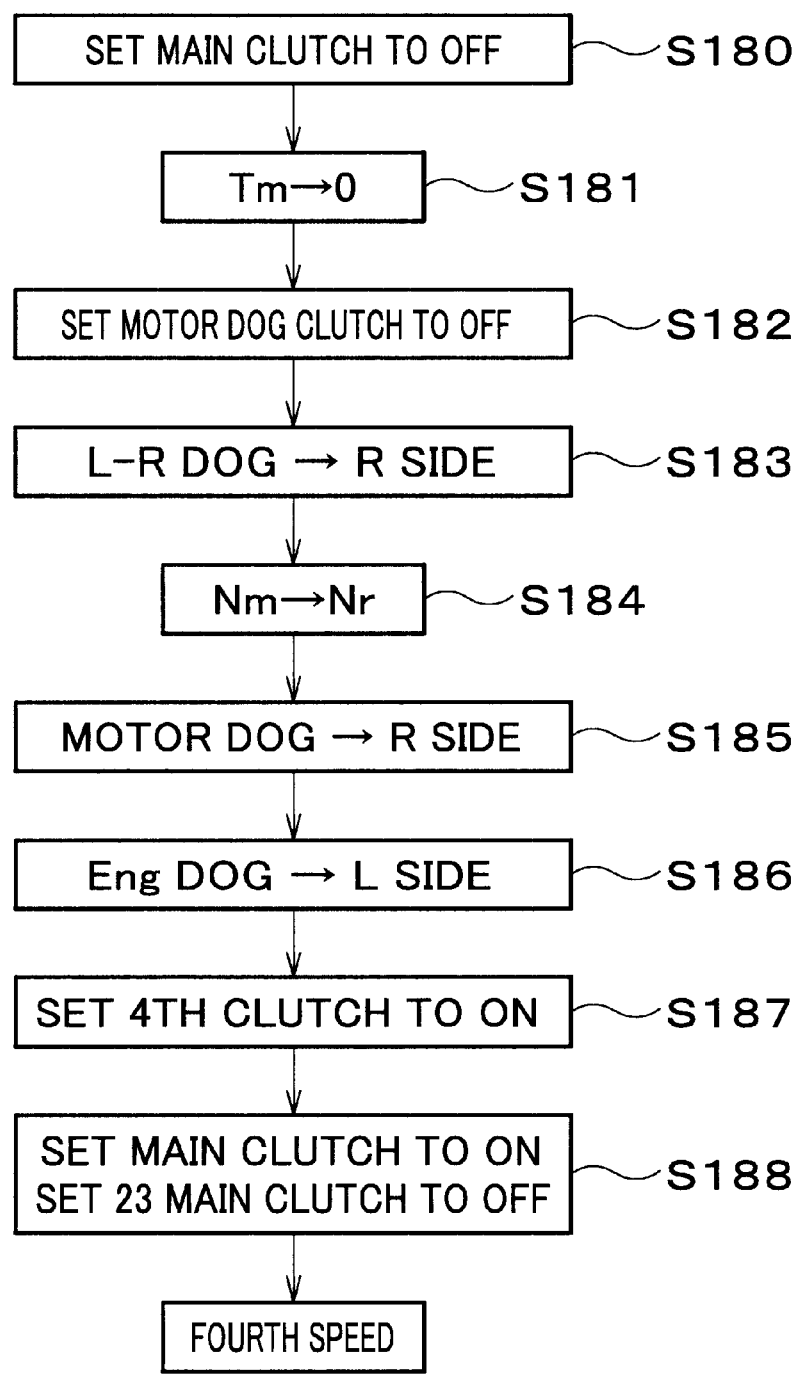
FIG. 26 is a flowchart, which shows the control flow of the 4AT power transmission device in the process of shifting from third speed to fourth speed.

The shifting operation from third speed to fourth speed shall now be described with reference to FIG. 22 and the flowchart of FIG. 26.

In the process of shifting from third speed to fourth speed, first, main clutch 71 is disengaged (S180). The torque Tm of motor 2 is then set to 0 (S181) and motor dog clutch 72 is disengaged from sun gear 60d and set to OFF (S182). The torque Tm of motor 2 is set to 0 to facilitate the disengagement of motor dog clutch 72. Then in order to adjust for the changing inertia, L-R DOG 77 is shifted to the R side (S183) and disengaged from the sun gear and low reactor gear 61 to lessen the inertia of the driving parts of the motor 2 side in the shifting process. Motor 2 is then controlled to match the motor rotation Nm to the ring gear rotation speed Nr (S184) and motor dog clutch 72 is shifted to the ring gear 60a side (S185). Eng DOG 73 is then shifted to the L side (S186) and fourth-speed (4TH) clutch 74 is set to ON (S187). These operations will be completed in an extremely short time. Lastly, by gradually engaging main clutch 71 and setting 23 main clutch 76 to OFF (S188), the process of shifting to the fourth speed is completed (t8).

Figure 20:
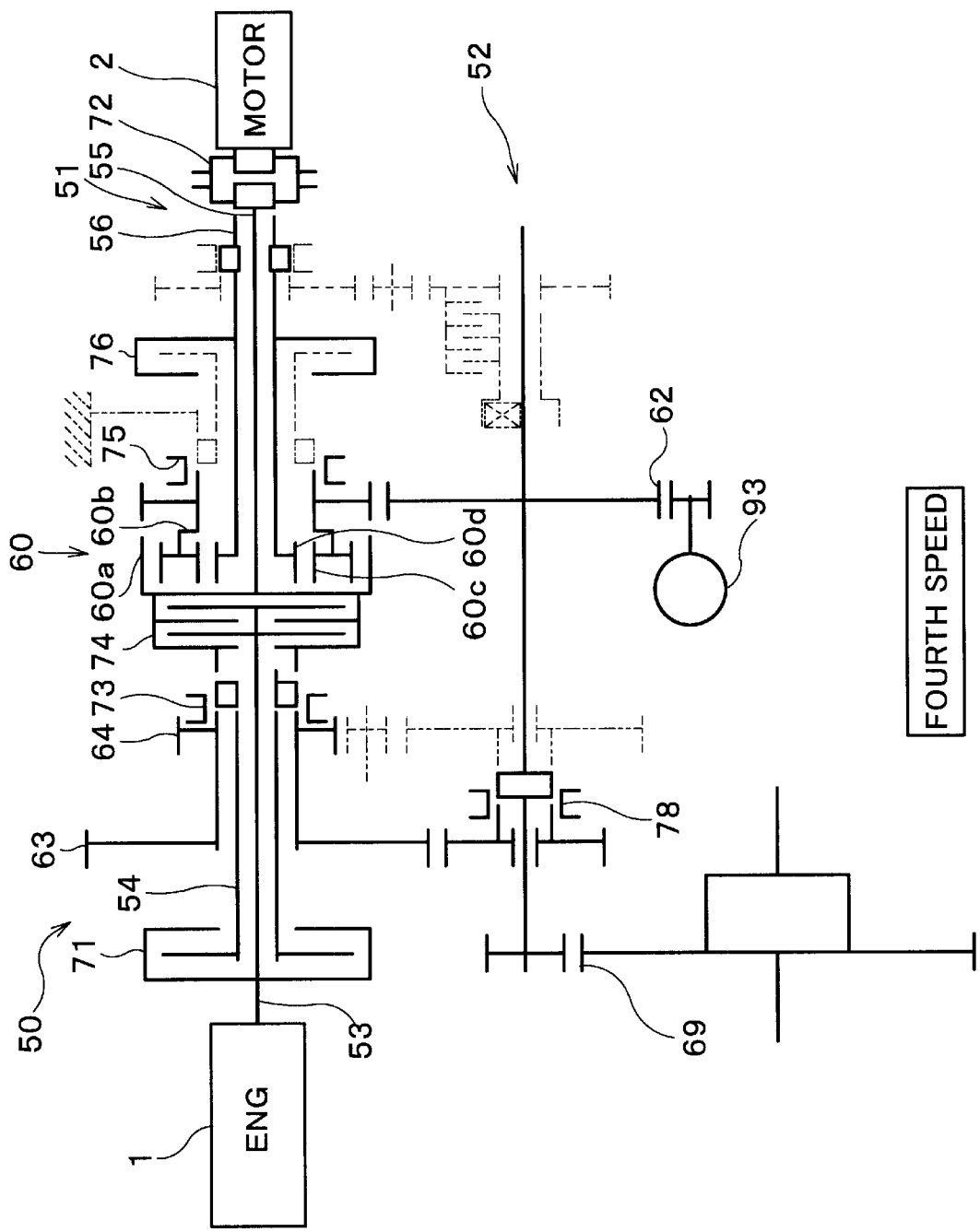
FIG. 20 is a diagram, which shows the gear engagement when the 4AT power transmission device is in the fourth speed condition.

The gear engagement condition at this time is shown in FIG. 20.

As main clutch 71 is engaged in the above-described shifting process, the rotation speeds of engine 1 and motor 2 decrease. Thus in order to prevent the occurrence of shift shock, the torque Tm of motor 2 is controlled so that the inertia of the driving parts of the motor 2 side will be maintained at the inertia prior to the engagement of main clutch 71. Since the inertia torque in the accelerating direction, which is generated by fourth-speed gear 63, and the inertia torque in the decelerating direction, which is generated by 123 gear 62, will thereby be made to cancel each other out, the shift shock can be reduced.

To be more specific, by setting the inertia ratio of the inertia Im, mainly due to engine 1 at the ring gear 60a side, to the inertia Ir, mainly due to 23 main clutch 76 at the sun gear 60d side, so that;

$$Ir = Im \times i4/(Z3/Z1)2/((Z1+Z3)/Z3 \times i123 - i4)$$

where,

Z1: number of gear teeth of the sun gear

Z3: number of gear teeth of the ring gear i123: 123 gear ratio i4: fourth-speed gear ratio the acceleration torque generated at fourth-speed gear 63 and the deceleration torque generated at 123 gear 62 can be made to cancel each other out to eliminate the shift shock.

<Reverse>

The gear operations that are carried out in the process of making the vehicle move in reverse by means of 4AT power transmission device 50 shall now be described.

In the condition where the vehicle and engine 1 are stopped, motor dog clutch 72 is shifted to the ring gear side and L-R DOG 77 is set to ON. L-R DOG 77 does not have to be engaged. Eng DOG 73 is then shifted to the reverse gear side (L side) and 4R DOG 78 is also shifted to the reverse gear side (R side).

When motor 2 is rotated forward, the ring gear rotates forward, drives counter shaft 52 via reverse gear 64, and makes the vehicle move in reverse.

When the rotation speed of the ring gear has become greater than or equal to the idling rotation speed of engine 1, engine 1 is ignited and started.

Figure 21:
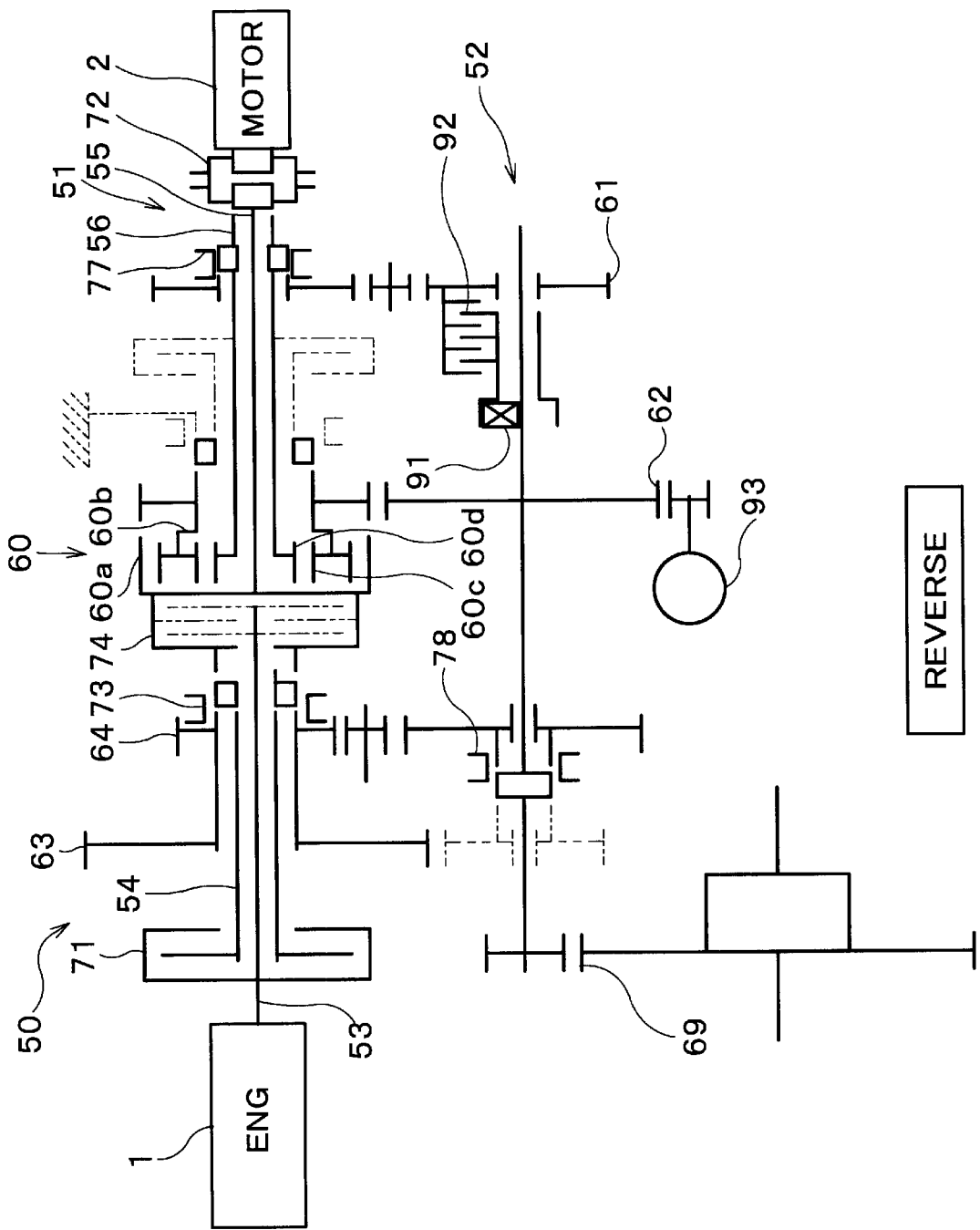
FIG. 21 is a diagram, which shows the gear engagement when the 4AT power transmission device is in the reverse condition.

The condition of gear engagement at this time is shown in FIG. 21.

Though embodiments of this invention have been described, this invention is not limited to the above-described embodiments.

For example, though for both AMT power transmission device 10 and 4AT power transmission device 50 of the embodiments, cases of shifting up were described, the shift shock can be reduced or eliminated in cases of shifting down as well. That is, whereas with prior-art power transmission devices, since the driving force during shifting down was consumed as rotational energy for increasing the speed of the engine, the driving force became cut off or decreased, with a power transmission device of the present invention, since the rotational energy, which has been increased in the shift-up process and is accumulated in the reactive elements, is released in the shift-down process, the cutting off or decrease of the driving force in the shifting down from a prior speed stage is eliminated, thereby reducing or eliminating the shift shock and enabling the realization of smooth shifting down.

What is claimed is:

1. A power transmission device of a device having a first prime mover and a second prime mover as drive sources, wherein said power transmission device is arranged so that respective inertia torques of the first prime mover and the second prime mover cancel each other out in a process of shifting from a first speed stage to a second speed stage, wherein in said process of shifting from the first speed stage to the second speed stage, an increase or decrease in a rotation speed of said first prime mover is a reverse of an increase or decrease in a rotation speed of said second prime mover.

2. A power transmission device as set forth in claim 1, wherein the shifting from the first speed stage to the second speed stage of said first prime mover and the shifting from the first speed stage to the second speed stage of said second prime mover are carried out substantially simultaneously.

3. A power transmission device as set forth in claim 1, wherein at least one of either said first prime mover or second prime mover is a motor and, in the process of shifting from the first speed stage to the second speed stage, the output torque of said motor is controlled so that the inertia torque of the first prime mover and the inertia torque of the second prime mover cancel each other out before and after the shift.

4. A power transmission device as set forth in claim 3, wherein the shifting from the first speed stage to the second speed stage of said first prime mover and the shifting from the first speed stage to the second speed stage of said second prime mover are carried out substantially simultaneously.

5. A power transmission device as set forth in claim 1, wherein in the process of shifting from said first speed stage to said second speed stage, control is performed so that a torque that cancels out the inertia torque of one of the prime movers is output by the other prime mover.

6. A power transmission device of a device having a first prime mover and a second prime mover as drive sources, wherein said power transmission device is arranged so that the respective inertia torques of the first prime mover and the second prime mover cancel each other out in a process of shifting from a first speed stage to a second speed stage, wherein a motor is the first prime mover and said power transmission device has a planetary gear set with a plurality of rotating elements, and the second prime mover, the motor, and an output shaft, each of which is connected to a respective rotating element of said prime mover, and wherein in the process of shifting from the first speed stage to the second speed stage, an increase or decrease in a rotation speed of said second prime mover is in a reverse relationship with respect to an increase or decrease in a rotation speed of said motor and an output of said motor is controlled so that the inertia torques of said second prime mover and said motor cancel each other out.

7. A power transmission device of a device having a first prime mover and a second prime mover as drive sources, wherein said power transmission device is arranged so that the respective inertia torques of the first prime mover and the second prime mover cancel each other out in a process of shifting from a first speed stage to a second speed stage, wherein a motor is the first prime mover and said power transmission device is equipped with a planetary gear set, a first transmission part, the second prime mover which is connected to said planetary gear set via said first transmission part, the motor and a second transmission part which are connected to said planetary gear set, and an output shaft which is connected to said first transmission part and said second transmission part, and wherein said planetary gear set has three rotating elements including a sun gear, a ring gear, and a carrier, and wherein said second transmission part is connected to one of the three rotating elements such that when said one rotating element is fixed, the other two rotating elements rotate in mutually opposite directions, and each of said second prime mover and said motor is connected to one of said other two rotating elements.

8. A power transmission device of a device having a first prime mover and a second prime mover as drive sources, wherein said power transmission device is arranged so that the respective inertia torques of the first prime mover and the second prime mover cancel each other out in a process of shifting from a first speed stage to a second speed stage, wherein said power transmission device is equipped with a planetary gear set, a first transmission part, the second prime mover which is connected to said planetary gear set via said first transmission part, a motor as the first prime mover and a second transmission part which are connected to said planetary gear set, and an output shaft which is connected to said first transmission part and said second transmission part, wherein said planetary gear set has three rotating elements including a sun gear, ring gear, and a carrier, and said second transmission part is connected to one of the rotating elements such that when said one rotating element is fixed, the other two rotating elements rotate in mutually opposite directions, and each of said second prime mover and said motor is connected to one of said other two rotating elements, and wherein in the process of shifting from the first speed stage to the second speed stage, said first transmission-part and said second transmission part are controlled so as to be actuated substantially simultaneously and the output of said motor is controlled so that the inertia torques of said second prime mover and said motor cancel each other out.

\* \* \* \* \*